US010426080B2

(12) United States Patent
Jugovich et al.

(10) Patent No.: US 10,426,080 B2
(45) Date of Patent: Oct. 1, 2019

(54) MOBILE TURF SPRAYER

(71) Applicant: The Toro Company, Minneapolis, MN (US)

(72) Inventors: William J. Jugovich, Elko New Market, MN (US); Todd A. Otto, Jordan, MN (US); Steven R. Peterson, Savage, MN (US); Brannon W. Polk, Evansville, IN (US); Steve A. Swinney, II, Hudson, WI (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 15/436,833

(22) Filed: Feb. 19, 2017

(65) Prior Publication Data

US 2017/0295719 A1 Oct. 19, 2017

Related U.S. Application Data

(60) Provisional application No. 62/297,793, filed on Feb. 19, 2016.

(51) Int. Cl.
| | |
|---|---|
| *A01C 21/00* | (2006.01) |
| *A01C 23/04* | (2006.01) |
| *B05B 13/00* | (2006.01) |
| *B05B 12/12* | (2006.01) |
| *A01M 7/00* | (2006.01) |

(52) U.S. Cl.
CPC .......... *A01C 21/005* (2013.01); *A01C 23/047* (2013.01); *A01M 7/00* (2013.01); *B05B 12/12* (2013.01); *B05B 13/005* (2013.01)

(58) Field of Classification Search
None
See application file for complete search history.

(56) References Cited

U.S. PATENT DOCUMENTS

| | | | | |
|---|---|---|---|---|
| 9,007,302 | B1 * | 4/2015 | Bandt-Horn | G06F 3/0202 345/156 |
| 2011/0295423 | A1 * | 12/2011 | Anderson | G05D 1/0088 700/248 |
| 2014/0259897 | A1 * | 9/2014 | Godbole | B05B 15/68 47/1.5 |
| 2016/0041803 | A1 * | 2/2016 | Markov | A01B 76/00 701/48 |
| 2016/0282866 | A1 * | 9/2016 | Yamamura | G05D 1/0088 |

OTHER PUBLICATIONS

Topcon Precision Agriculture, System 350 X30 Console Guidance & Auto Steering Operators Manual, Jul. 2014, 268 pages.

* cited by examiner

*Primary Examiner* — Lail A Kleinman
(74) *Attorney, Agent, or Firm* — Merchant & Gould P.C.

(57) ABSTRACT

A mobile turf sprayer operates to spray a product onto a turf site. In some embodiments the mobile turf sprayer identifies a plurality of regions of the turf site to be sprayed and automatically sprays product onto those regions as the mobile turf sprayer moves about the turf site.

20 Claims, 20 Drawing Sheets

MOBILE TURF SPRAYER

CROSS-REFERENCE TO RELATED APPLICATIONS

This application claims priority to U.S. Patent Application Ser. No. 62/297,793 titled MOBILE TURF SPRAYER filed Feb. 19, 2016, the disclosure of which is hereby incorporated by reference in its entirety.

BACKGROUND

Turf sites, such as golf courses, can often benefit by the application of various products. For large sites, a mobile turf sprayer may be used to deliver the products to the desired locations and sprayed onto the site. Several examples of such products include fertilizers, pesticides, fungicides, herbicides, growth regulators, and colorants.

Due to the wide variety of turf characteristics present on a golf course, for example, the application of such products can be a complicated endeavor, especially if maintenance staff wants to ensure that products are properly applied to each area, and wants to minimize waste. Although spray systems are available with computerized systems that attempt to assist in managing this process, they are typically complicated to use and inefficient. Therefore, there is a need for a mobile turf sprayer that improves upon the state of the art.

SUMMARY

In general terms, this disclosure is directed to a mobile turf sprayer. In one possible configuration and by non-limiting example, the mobile turf sprayer identifies a plurality of regions of a site to be sprayed and automatically sprays product onto those regions as the mobile turf sprayer moves about the site. In some embodiments, multiple regions can be grouped into a single job, for example, allowing the operator to drive the mobile spray vehicle from region to region without having to switch between multiple different jobs. Various aspects are described in this disclosure, which include, but are not limited to, the following aspects.

One aspect is a method of spraying a turf site using a mobile turf sprayer, the method comprising: identifying a plurality of regions of a turf site to be sprayed with the mobile turf sprayer, at least some of the plurality of regions being separated from each other; determining a location of the mobile turf sprayer as it moves about the turf site; determining that the mobile turf sprayer is located at an unsprayed portion of at least one of the plurality of regions; and automatically spraying the unsprayed portion of the at least one of the plurality of regions as the mobile turf sprayer moves about the turf site.

Another aspect is a mobile turf sprayer for spraying a turf site, the mobile turf sprayer comprising: a tank for holding a product to be sprayed; a spray system including a plurality of nozzles, the spray system configured to supply the product from the tank to the nozzles for application to a turf site; positioning system electronics configured to receive signals usable to determine a location of the mobile turf sprayer; and a computing device including at least a processing device and a computer readable storage device, the computing device in data communication with the positioning system electronics and operable to control the spray system, the computer readable storage device storing data instructions executable by the computing device to cause the computing device to: identify a plurality of regions of a turf site to be sprayed with the mobile turf sprayer, at least some of the regions being separated from each other; determine a location of the mobile turf sprayer as it moves about the turf site using the positioning system electronics; determine that the mobile turf sprayer is located at an unsprayed portion of at least one of the regions; and automatically spraying the unsprayed portion of the at least one of the regions using the spray system, as the mobile turf sprayer moves about the turf site.

Another aspect is a mobile turf sprayer comprising at least a computing device and a spray system, wherein the mobile turf sprayer is configured to perform any one or more of the methods described herein.

A further aspect is a method of treating a turf site using a mobile treatment device, the method comprising: identifying a plurality of regions of a turf site to be treated with the mobile treatment device, at least some of the plurality of regions being separated from each other; determining a location of the mobile treatment device as it moves about the turf site; determining that the mobile treatment device is located at an untreated portion of at least one of the plurality of regions; and automatically treating the untreated portion of the at least one of the plurality of regions as the mobile treatment device moves about the turf site.

Yet another aspect is a mobile treatment device for treating a site, the mobile treatment device comprising: a treatment system for applying a treatment to the site, the treatment system including a treatment controller; positioning system electronics configured to receive signals usable to determine a location of the mobile treatment device; and a computing device including at least a processing device and a computer readable storage device, the computing device in data communication with the positioning system electronics and operable to control the treatment system, the computer readable storage device storing data instructions executable by the computing device to cause the computing device to: identify a plurality of regions of a site to be treated by the mobile treatment device, at least some of the regions being separated from each other; determine a location of the mobile treatment device as it moves about the site using the positioning system electronics; determine that the mobile treatment device is located at an untreated portion of at least one of the regions; and automatically treating the untreated portion of the at least one of the regions using the treatment system as the mobile treatment device moves about the site.

A further aspect is a mobile treatment device comprising at least a computing device and a treatment system, wherein the mobile treatment device is configured to perform any one or more of the methods described herein.

DETAILED DESCRIPTION

Figure 1:
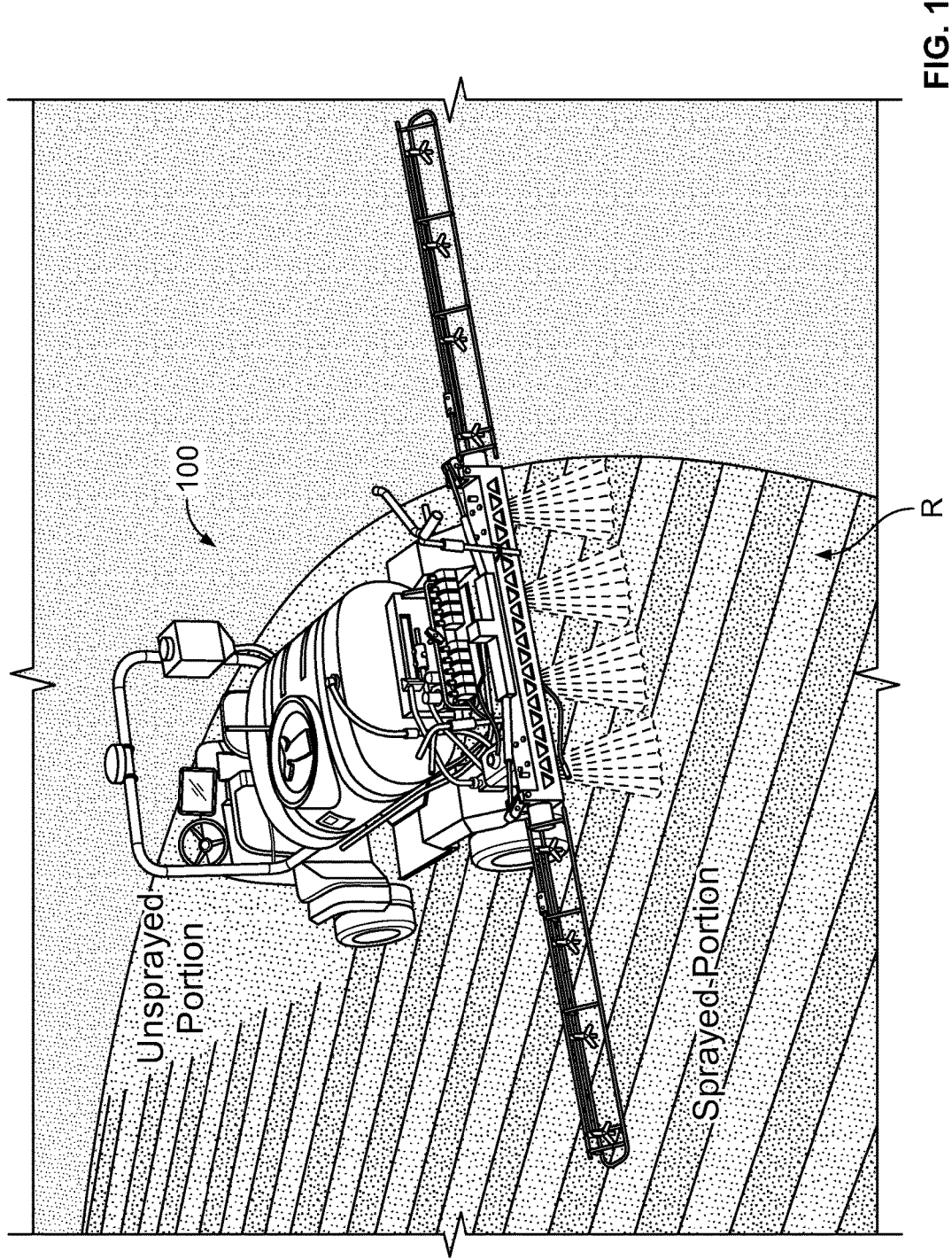
FIG. 1 is a perspective view of an example mobile turf sprayer.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Proper application of products to a turf site can be a complicated endeavor, due in part to the unique characteristics of various regions of a turf site. For example, a golf course typically has various regions including tee boxes, fairways, greens, roughs, collars, and hazards such as sand traps and water. Each of these types of regions has unique characteristics, and therefore must be treated differently. For example, product flow rates, types of products, and frequency of product application may all vary depending on the characteristics of the respective types of regions.

Because of this, once the mobile turf sprayer is properly setup to spray a particular type of region, it would be beneficial and most efficient for the maintenance staff to be able to identify several or all of the regions of that same type, and to be able to spray them all in a single batch before adjusting the spray settings for other regions of the turf site. Furthermore, it would be beneficial if the operator could move between the various regions in the job or even go back and forth between those regions to allow the operator greater flexibility in completing the job.

FIG. 1 is a perspective view of an example mobile turf sprayer 100 at a turf site S. The turf site S includes a region R to be sprayed, and includes a sprayed region and an unsprayed region.

The mobile turf sprayer 100 is a machine configured to spray a product onto a site. In this example, the mobile turf sprayer 100 is a mobile spray vehicle, but in other embodiments the mobile turf sprayer 100 can implemented on a trailer, or as a combination of a vehicle (such as a utility vehicle) and a trailer. The mobile turf sprayer 100 is illustrated and described in further detail herein, such as with reference to FIGS. 4-5.

The turf site S is typically a single portion of the Earth that includes at least some turf (but may also include non-turf areas, such as water, sand, asphalt, and the like) that would benefit from the application of a product. The turf site S can be a single area, or can include multiple separate areas. An example of the turf site S is illustrated and described in further detail with reference to FIG. 2.

Within the turf site S is a plurality of regions R. A portion of one region R is shown in FIG. 1. In this example, the region R is a part of the turf site onto which a product is to be sprayed. However, in some embodiments regions can be designated as inclusion regions or exclusion regions. An inclusion region is one that is designated to be sprayed, while an exclusion region is one that is designated not to be sprayed. As one example, a turf rough may be designated as an inclusion region to be sprayed, whereas a pond within the rough may be segregated out as an exclusion region that does not need to be sprayed.

Once spraying of the site has begun, portions of the regions are sprayed. FIG. 1 illustrates an example in which the mobile turf sprayer has already sprayed a sprayed portion of the region R, and is about to spray the remaining unsprayed portion.

Figure 2:
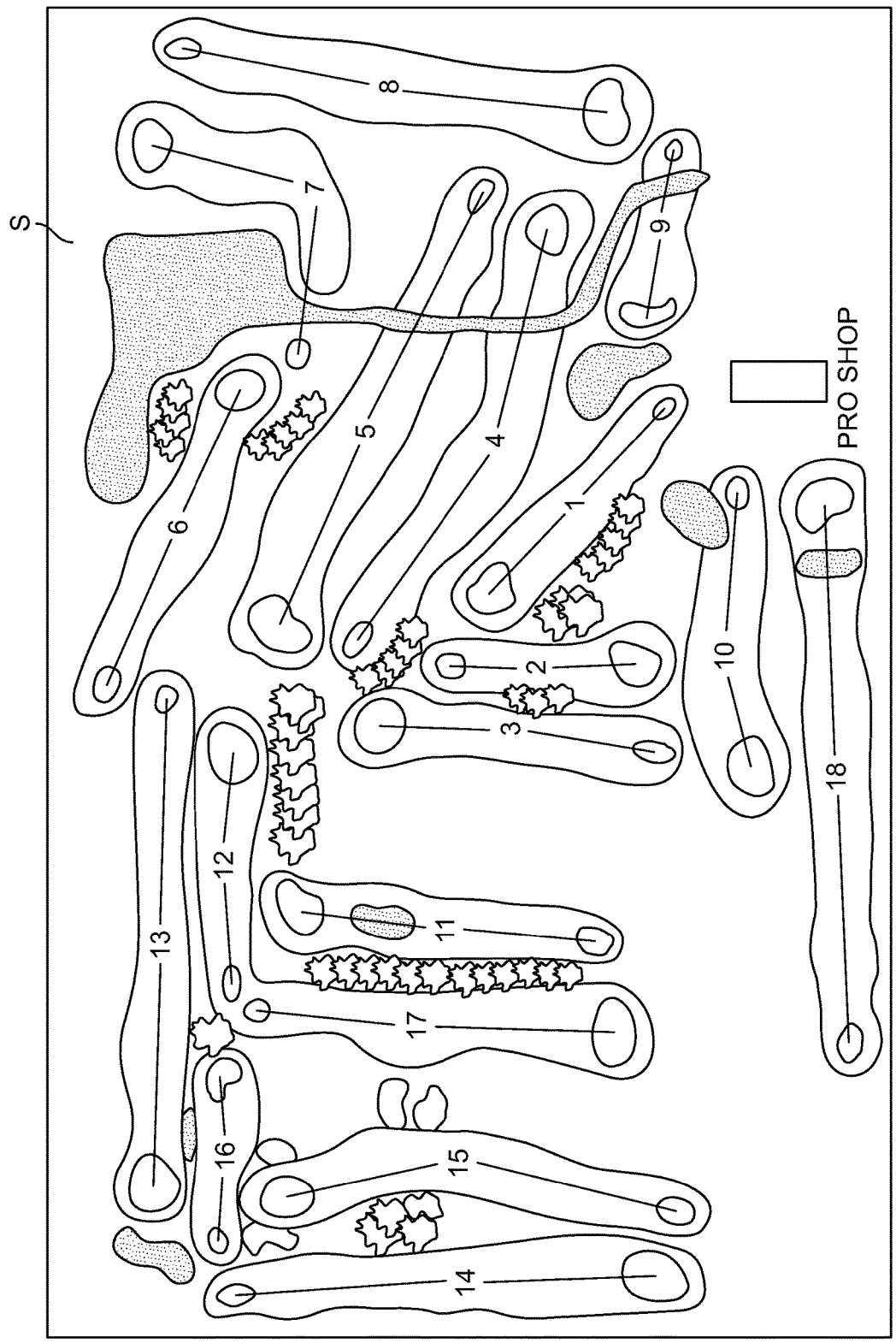
FIG. 2 is map depicting an example site on which the mobile turf sprayer shown in FIG. 1 can be used. In this example, the site is a golf course.
Figure 3:
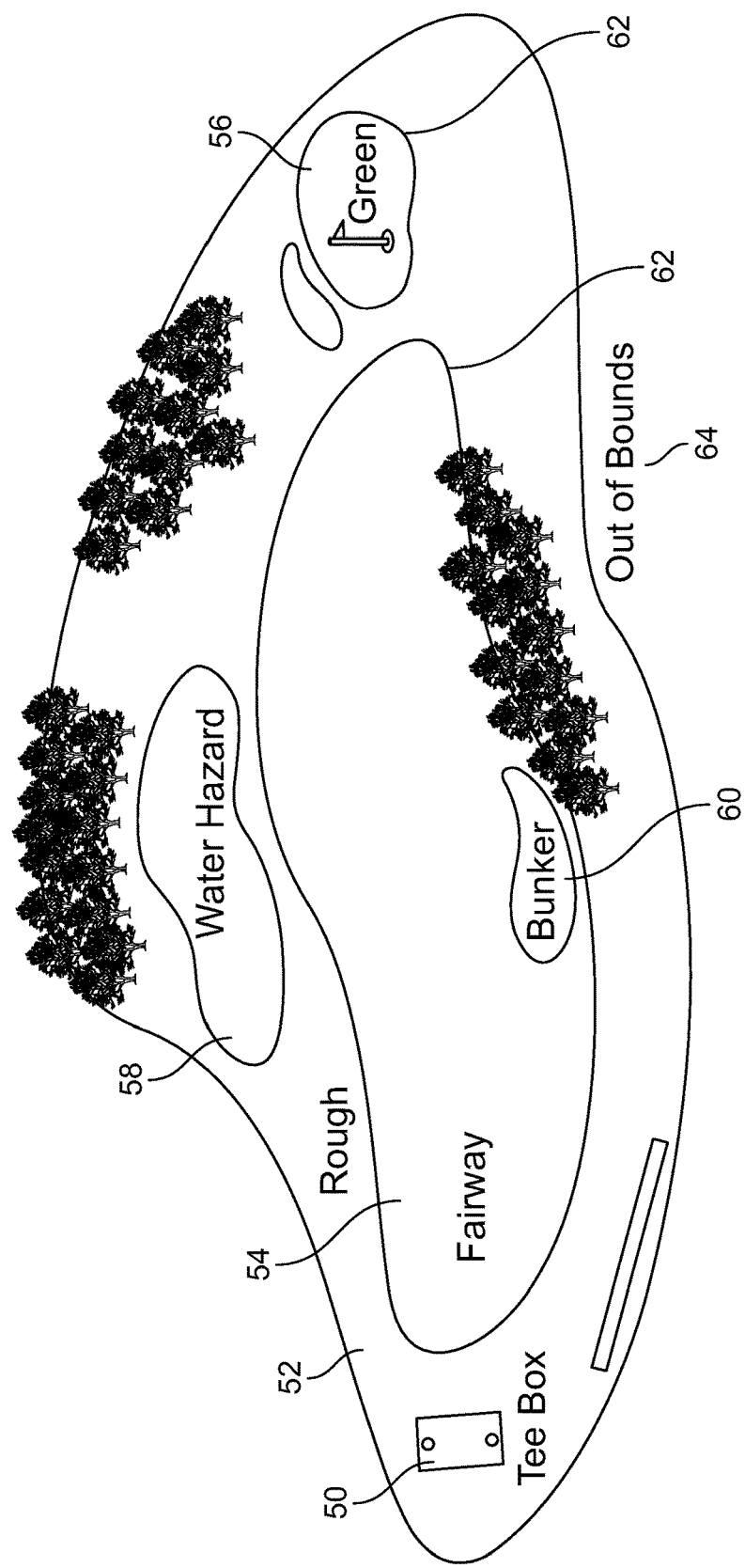
FIG. 3 is a schematic diagram depicting an example hole of a golf course.

FIGS. 2-3 illustrate an example of a turf site S in the form of a golf course. FIG. 2 is a map depicting an example site on which the mobile turf sprayer 100 can be used. In this example, the site is an 18-hole golf course. FIG. 3 is a schematic diagram illustrating an example hole of a golf course.

A golf course is typically divided up into a plurality of areas referred to as holes (1-18). Referring to FIG. 3, each hole typically includes at least a tee box 50, a rough 52, a fairway 54, a green 56. In addition, some holes include one or more hazards, such as a water hazard 58 or a sand bunker 60, and collars 62 around greens or fairways. Areas between or surrounding the holes are sometimes classified as out of bounds 64.

A great deal of effort and care goes into maintaining a high quality golf course. In particular, caring for the turf typically involves various maintenance activities including watering, mowing, aeration, top dressing, and the application of various products that can include (in addition to water) fertilizers, pesticides, fungicides, herbicides, growth regulators, colorants, and more. In some embodiments products are chemical products.

One of the factors that complicates the maintenance of a golf course is that the golf course has so many different regions, and depending on the characteristics of the region, different maintenance steps are required. For example, the greens may require a certain amount of product (per unit area), whereas the fairways, roughs, and tee boxes may each require different amounts of the product. This is compounded by the fact that there are numerous holes, and also by the fact that numerous products may need to be applied. Further, such maintenance activities are often performed during the day when golfers can be out on the field. As a courtesy to the golfers the maintenance staff will typically try to work on areas of the course away from the golfers, and as a result the mobile turf sprayer operators are often forced to move about the course performing maintenance activities between gaps in play.

Although a golf course is shown as one example of the turf site S, the present disclosure is equally applicable to a variety of other turf sites, such as commercial or residential properties, athletic fields, municipal parks, schools and university campuses, and other turf sites.

For ease of description, the present disclosure makes reference to example embodiments involving a mobile turf sprayer. However, at least most of the principles, operations, functions, and features disclosed herein are equally applicable to other mobile treatment devices. Therefore, the mobile turf sprayer is described as just one example of a mobile treatment device, but other embodiments involve other mobile treatment devices. Some other examples of mobile treatment devices include mowers (fairway mowers, rough mowers, greens mowers, trim and surround mowers), top dressers, greens rollers, bunker rakes, debris blowers, aerators, cultivators, sweepers, and vacuums. Therefore, references in the present disclosure to one form of treatment device are also applicable to other forms of treatment devices to form other embodiments within the scope of the present disclosure.

Additionally, spraying is described herein as one example of a treatment. Other treatments can be performed in other embodiments. Examples of treatments include mowing, top dressing, rolling, raking, blowing, aerating, cultivating, sweeping, and vacuuming. Therefore, references in the present disclosure to one form of treatment are also applicable to other forms of treatment to form other embodiments within the scope of the present disclosure. Treatments include turf treatments that can be applied to turf sites, and other treatments that can be applied to other sites. Although the treatments described herein are typically described as turf treatments, treatments to non-turf sites are also included in other embodiments. As just one example, a sand beach can be treated by grooming it using a sand or bunker-type rake treatment device, using the systems, methods, and principles described herein.

Further, the spray system described herein is one example of a treatment system. Other treatment systems are included in other embodiments. Examples of treatment systems include mowing systems, spreader systems, top dressing systems, rolling systems, blowing systems, aerating systems, cultivating systems, sweeping systems, and vacuuming systems. In typical embodiments a treatment controller is provided in each of the treatment systems (similar to spray controller 130 described herein) that controls the operation of the respective systems and interfaces with the control system 110 also described herein.

Figure 4:
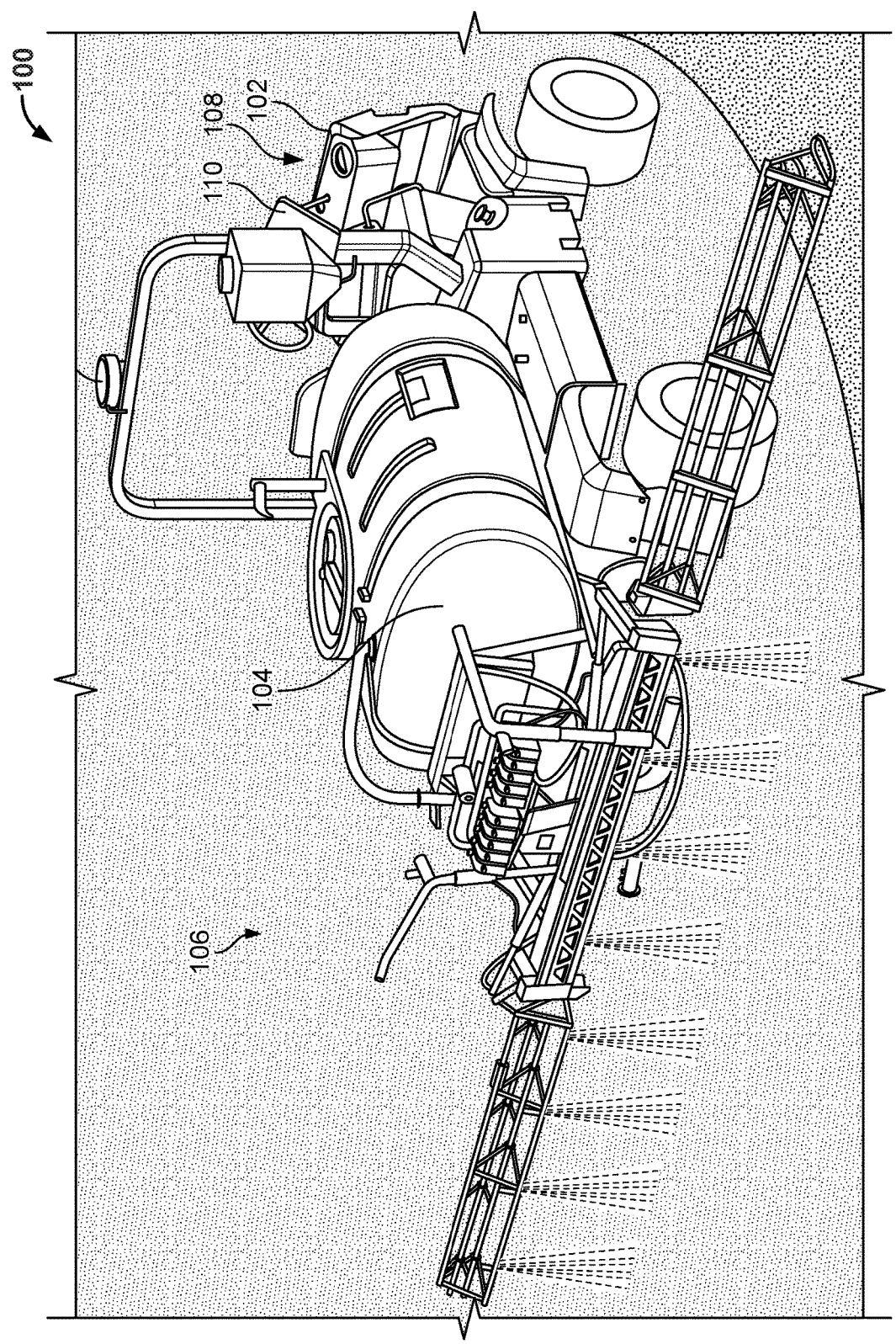
FIG. 4 is another perspective view of the example mobile turf sprayer shown in FIG. 1.

FIG. 4 is a perspective view of an example mobile turf sprayer 100. In this example the mobile turf sprayer 100 includes a vehicle 102, a tank 104, a spray system 106, a positioning system 108, and a control system 110.

In some embodiments the mobile turf sprayer 100 includes the vehicle 102, while in other embodiments the vehicle may be separate from the mobile turf sprayer 100. In this example the vehicle 102 is a motorized vehicle, such as having an engine that supplies power to one or more wheels, such as through a transmission, propelling the vehicle 102 and allowing it to move about the site. A steering system and throttle and brake pedals or other controls are provided to allow the operator to control the direction and speed of travel of the vehicle 102. The mobile turf sprayer 100 also typically includes a body or frame structure that supports the other components thereon.

The tank 104 is provided for temporarily storing the product to be applied to the site. Tanks of various sizes can be used depending on the amount of product to be applied. An opening in the tank is coupled to a conduit that allows product to be removed from the tank.

The spray system 106 receives product from the tank 104 and operates to spray that product onto the turf site using a plurality of spray nozzles. An example of the spray system 106 is illustrated in further detail in FIG. 5.

The positioning system 108 operates to determine a location of the mobile turf sprayer on the site. An example of a positioning system 108 is a global positioning system (GPS) receiver. The typical GPS receiver does not provide very accurate positioning however (such as to about 15 m) and therefore in some embodiments the positioning system also or alternatively utilizes one or more alternative technologies. One of these technologies is Wide Area Augmentation System (WAAS), which can provide improved positioning accuracy (such as to about 3 m). Another of these technologies is Real Time Kinematic (RTK) technology, which can provide further enhancement of the positioning accuracy (such as to about 0.01 m). One example of a positioning system is the AGI-4 receiver available from Topcon Positioning Systems, Inc. of Livermore, Calif.

In addition to identifying a location of the positioning system 108, either the positioning system itself or the control system 110 discussed herein can also be programmed to determine the precise locations of any other part of the mobile turf sprayer. For example, a position of an outer edge of the front left-side wheel can be determined, which can be a useful reference point that is easily visible to the operator. This point can be used for defining boundaries within the site, for example, as discussed in further detail herein. Additionally, the position of each spray nozzle can be precisely determined. In order to do so, measurements or models of the mobile turf sprayer are provided to the positioning system 108 or the control system 110, which can then compute the location of the respective point of the mobile turf sprayer 100 based on one or more distances between the point and the positioning system 108.

The control system 110 includes a computing device and controls the operation of the spray system based on location information received from the positioning system 108.

Figure 5:
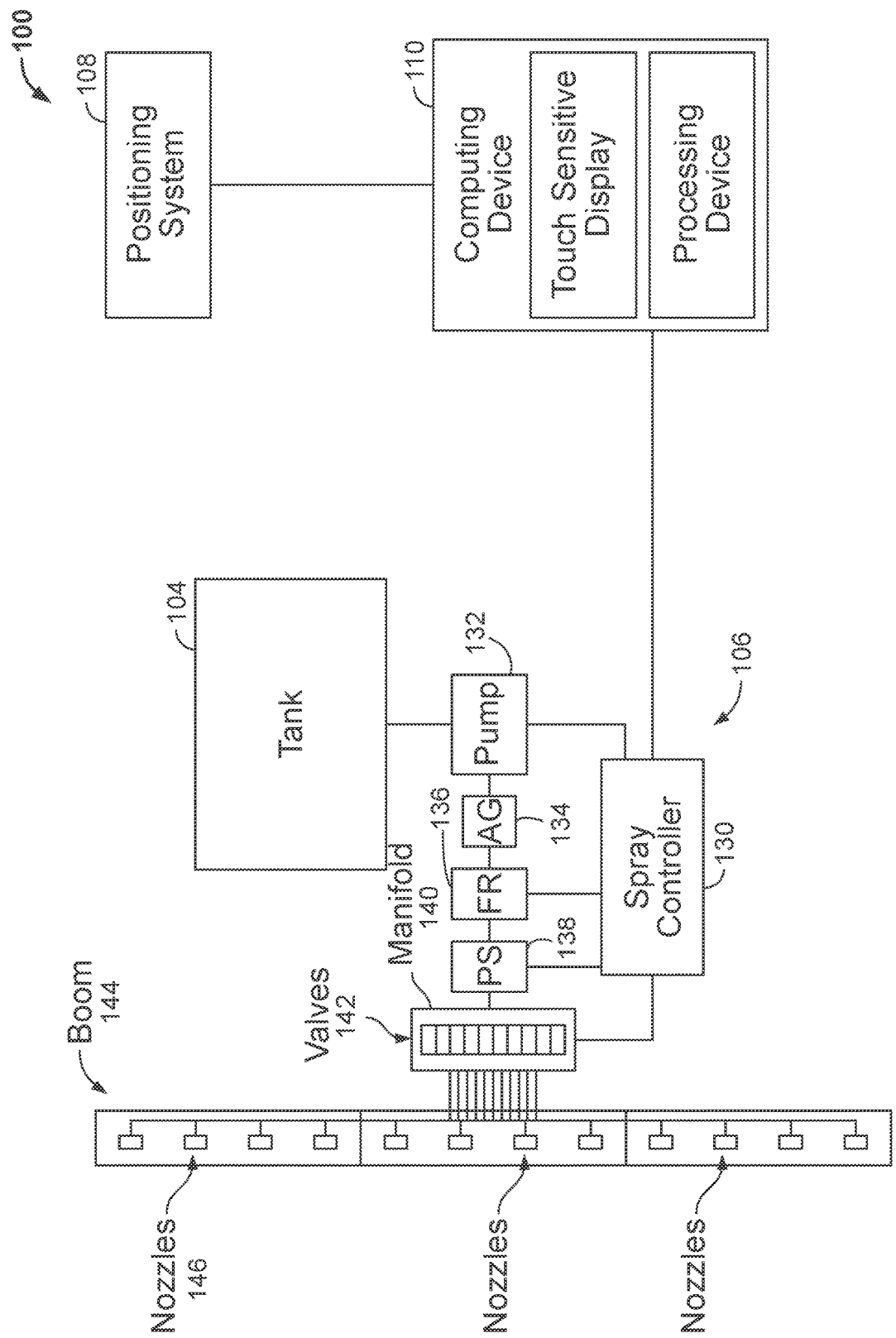
FIG. 5 is a schematic block diagram illustrating aspects of the mobile turf sprayer shown in FIG. 1.

FIG. 5 is a schematic block diagram illustrating aspects of the mobile turf sprayer 100. As described in FIG. 4, the example mobile turf sprayer 100 includes the tank 104, spray system 106, positioning system 108, and control system 110.

In this example, the spray system 106 further includes a spray controller 130, pump 132, agitation valve 134, flow meter 136, pressure sensor 138, manifold 140, valves 142, boom 144, and spray nozzles 146. Various conduits are also used to convey fluid between the tank and components of the spray system 106.

The spray controller 130 is in electrical or data communication with the control system 110, and operates under the control of the control system 110, and is also in electrical or data communication with and controls the pump, agitation valve 134, flow meter 136, pressure sensor 138, and valves 142. An example of the spray controller is the ASC-10 auto section controller available from Topcon Positioning Systems, Inc.

The pump 132 operates to retrieve product from the tank 104 and advance the product through the spray system 106. In some embodiments the pump 132 has a variable flow rate that can be adjusted by the spray controller 130 and control system 110, such as depending on the desired application flow rate and the number of nozzles 146 in use at any given time.

The agitation valve 134 operates to redirect a portion of the product supplied by the pump 132 back to the tank, which is used for agitating the product in the tank.

The flow meter 136 operates to measure the flow rate of the product. In some embodiments the flow meter 136 is used for flow rates above a predetermined threshold, but can be less reliable below for flow rates below the threshold.

The pressure sensor 138 measures a pressure of the product. In some embodiments the pressure sensor 138 is used to estimate the flow rate when the flow rates is below the predetermined threshold at which the flow meter 136 is less reliable. The measured pressure can be used to estimate the flow rate.

The product is then directed to a manifold 140 that directs the product toward each of the nozzles. Valves 142 are provided that are individually controllable by the spray controller 130 and control system 110 to selectively turn on and off the product flow through each valve 142 and associated nozzle 146.

In some embodiments the mobile turf sprayer 100 includes a boom 144, which is a frame structure that supports the nozzles 146 and conduits leading to the nozzles. In some embodiments the boom 144 includes several sections, such as including a center section and two wing sections. The wing sections are connected to the center section by a pivoting joint that allows the wing sections to fold back when not in use, for ease of transportation and storage.

The nozzles 146 are secured to the boom and are typically spaced from each other a uniform distance. In some embodiments nozzles are arranged on a turret mount, such as a triple turret mount, which allows the operator to simply rotate the turret mount to select between several available nozzles. A quick-disconnect is also provided in some embodiments to allow for easy removal and replacement of nozzles. In some embodiments the nozzles are color coded based on the type of nozzle for ease of identification.

The control system 110 acts as the primary user interface to allow the mobile turf sprayer to interact with, control, and adjust the operation of the spray system 106. In some embodiments the control system 110 includes a computing device 150, such as one having a form of a tablet computer. The computing device 150 includes at least one processing device 152, and in some embodiments includes a touch sensitive display 154. In this example the control system 110 receives location data from the positioning system 108, and controls the operation of the spray system 106 using the spray controller 130. An example of the computing device 150 is illustrated and described in further detail with reference to FIG. 6.

It is typically desirable for the computing device 150, including the touch sensitive display 154, to be mounted near the driver's seat of the mobile turf sprayer 100 so that it is visible to the operator when driving the mobile turf sprayer. In some embodiments the computing device 150 is mounted to a dash or frame, and a pivoting or ball-type joint can be used to allow the operator to adjust the position and angle of the display for improved visibility and comfort.

Figure 6:
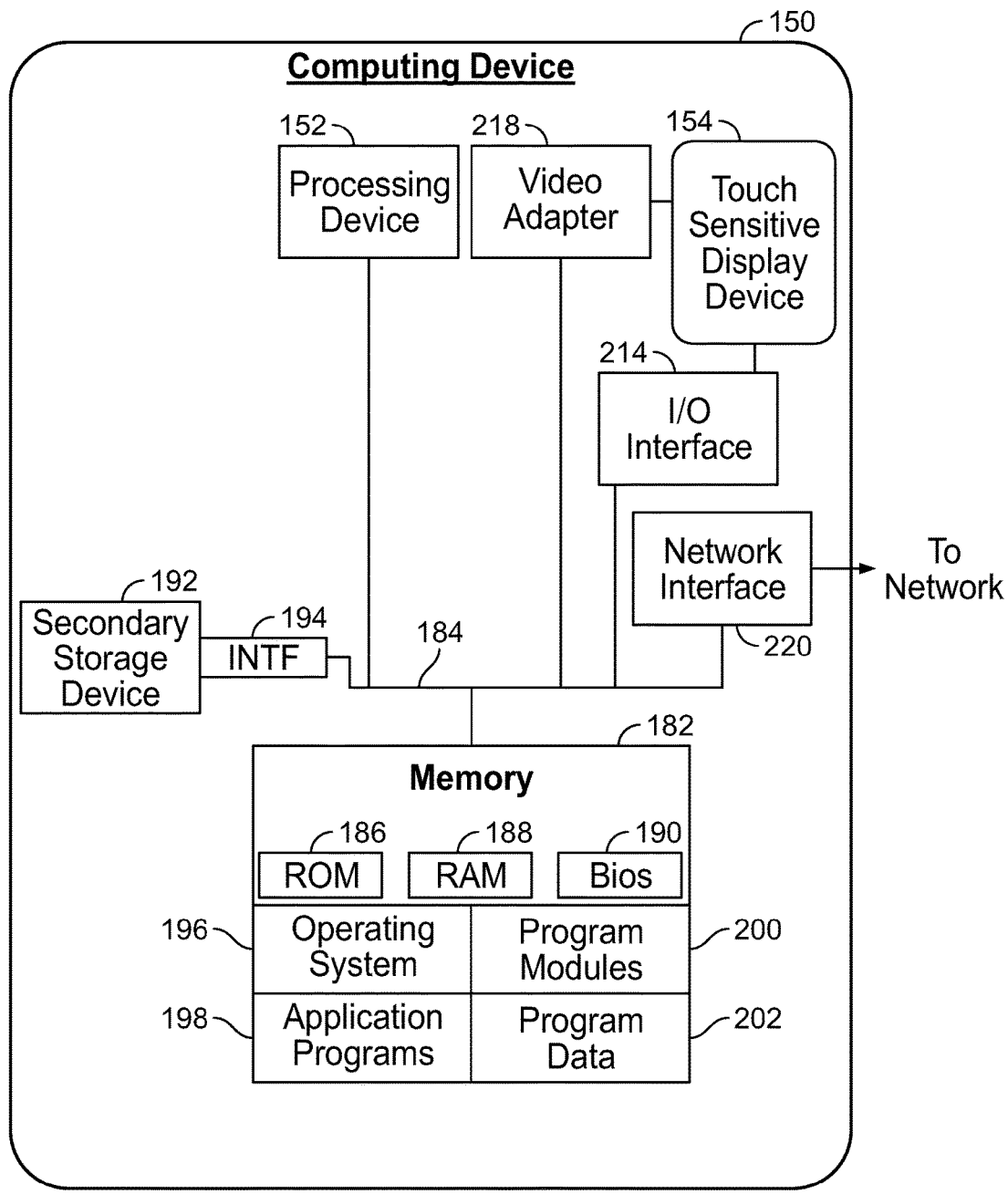
FIG. 6 is a block diagram illustrating an example computing device of the mobile turf sprayer shown in FIG. 1.

FIG. 6 illustrates an exemplary architecture of a computing device that can be used to implement aspects of the present disclosure, including any of the computing device 150 of the control system 110, or other computing devices. The computing device illustrated in FIG. 6 can be used to execute the operating system, application programs, and software modules (including the software engines) described herein.

The computing device 150 includes, in some embodiments, at least one processing device 152, such as a central processing unit (CPU). A variety of processing devices are available from a variety of manufacturers, for example, Intel or Advanced Micro Devices. In this example, the computing device 150 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 150 include a server computer, a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 150, such as during start up, is typically stored in the read only memory 186.

The computing device 150 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 150.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or memory 182, including an operating system 196, one or more application programs 198, other program modules 200 (such as the software engines described herein), and program data 202. The computing device 150 can utilize any suitable operating system, such as Microsoft Windows™, Google Chrome™, Google Android, Apple OS, Apple iOS, Linux, and any other operating system suitable for a computing device.

In some embodiments, a user provides inputs to the computing device 150 through one or more input devices, such as the touch sensitive display 216. Other input devices can also be used, such as a keyboard, mouse, pointer control device (such as a touch pad, touch stick, joy stick, etc.), microphone, and any other suitable input device. The input devices are often connected to the processing device 180 through an input/output interface 214 that is coupled to the system bus 184. Wireless communication between input devices and the interface 214 is possible as well, and includes infrared, BLUETOOTH® wireless technology, IEEE 802.11x Wi-Fi technology, cellular, or other radio frequency communication systems.

In this example embodiment, a display device 216, such as a monitor, liquid crystal display device, projector, or touch sensitive display device, is also connected to the system bus 184 via an interface, such as a video adapter 218. In addition to the display device 216, the computing device 150 can include various other peripheral devices (not shown), such as speakers or a printer.

When used in a local area networking environment or a wide area networking environment (such as the Internet), the computing device 150 is typically connected to the network 112 through a network interface 220, such as an Ethernet interface, or by a wireless communication device, such as using cellular or Wi-Fi communication.

The computing device 150 typically includes at least some form of computer readable media. Computer readable media includes any available media that can be accessed by the computing device 150. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 150. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

Figure 7:
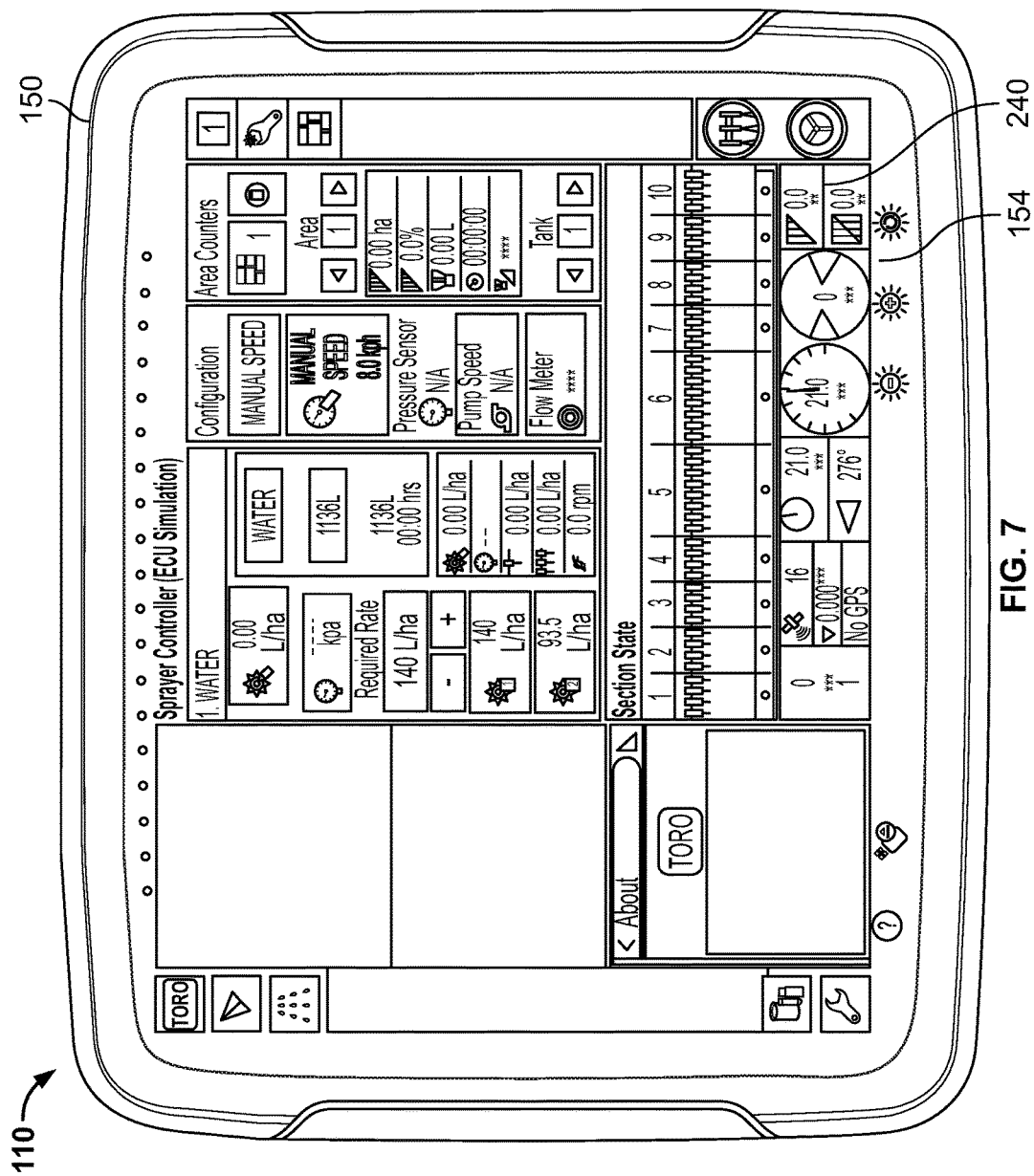
FIG. 7 is a front view of the example computing device of FIG. 6, depicting a touch sensitive display.

FIG. 7 is a front view of an example control system 110, including the computing device 150 and touch sensitive display 154. The control device 110 (and computing device 150) generates and displays a graphical user interface 240, discussed in further detail herein. In some embodiments the graphical user interface 240 provides a plurality of menus and selectable controls that allow the operator to provide inputs into the control system 110 to adjust the setup, configuration, and operation of the control system 110 and the spray system 106.

Figure 8:
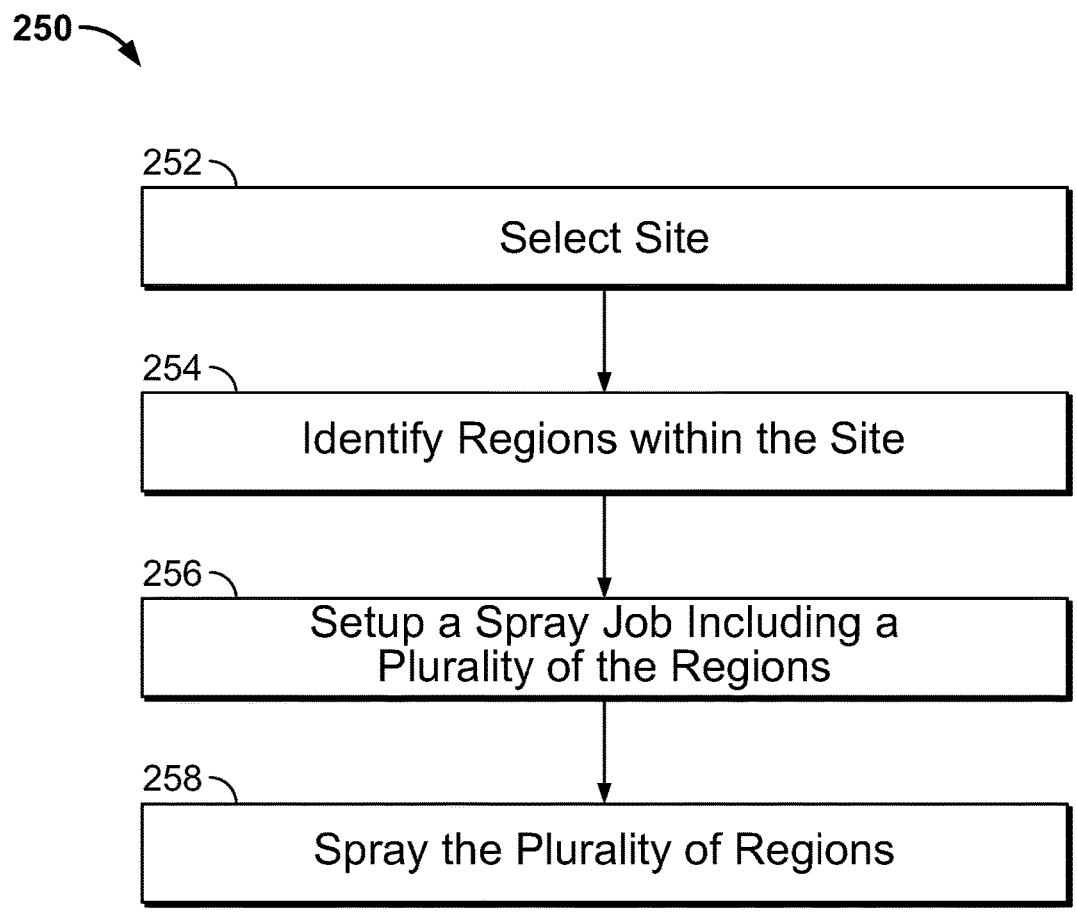
FIG. 8 is a schematic block diagram illustrating an example method of spraying a site using a mobile turf sprayer.

FIG. 8 is a flow chart illustrating an example method 250 of spraying a turf site using a mobile turf sprayer 100. In this example the method 250 includes operations 252, 254, 256, and 258.

The operation 252 is performed to select a site. An example of the operation 252 is illustrated and described in further detail with reference to FIGS. 9-10.

The operation 254 is performed to identify regions within the site. An example of the operation 254 is illustrated and described in further detail with reference to FIGS. 11-16.

The operation 256 is performed to setup a spray job including a plurality of the regions. An example of the operation 256 is illustrated and described in further detail with reference to FIGS. 17-19.

The operation 258 is performed to spray the plurality of regions. An example of the operation 258 is illustrated and described in further detail with reference to FIG. 20.

Figure 9:
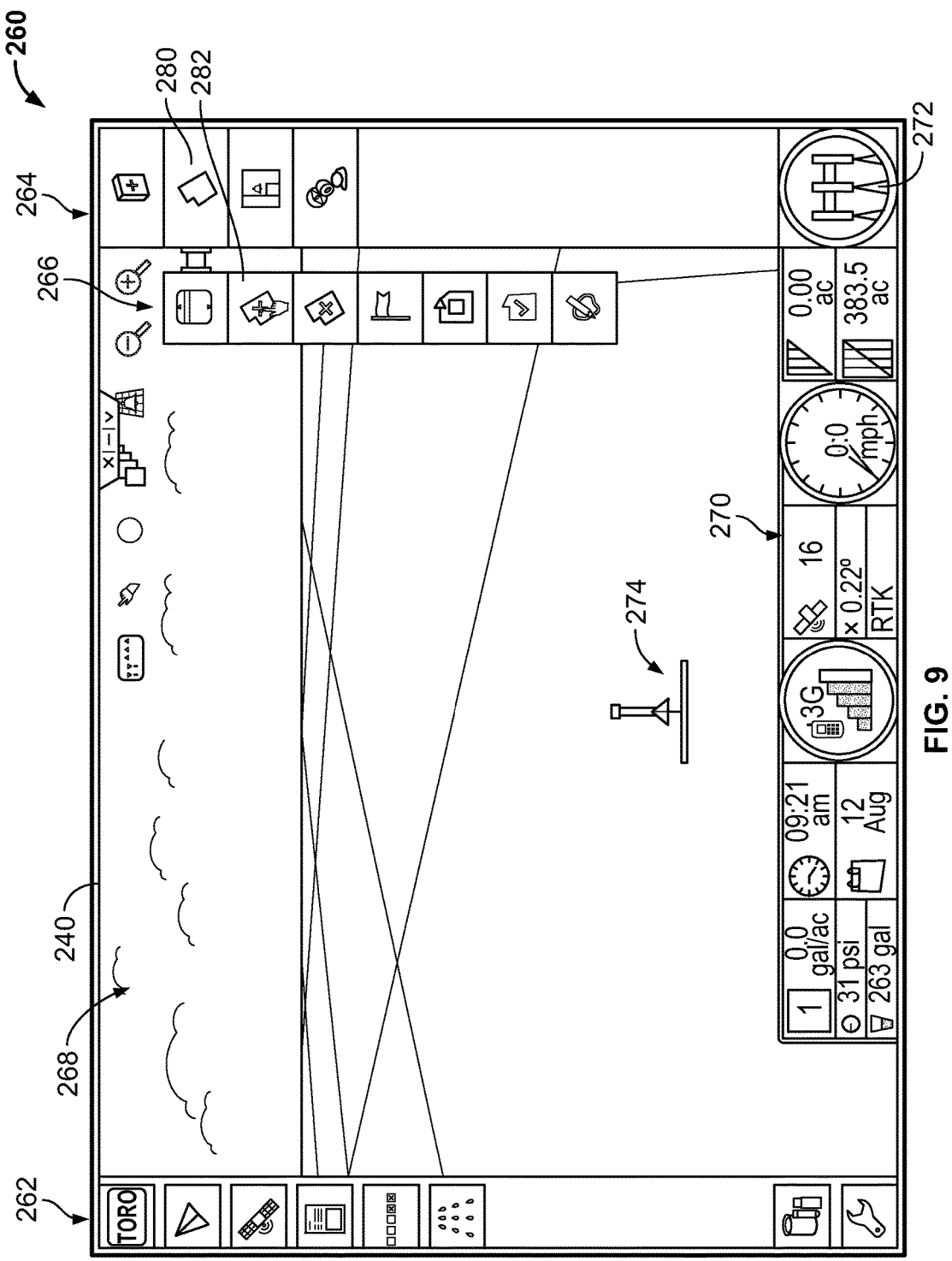
FIG. 9 is a screen shot of a graphical user interface illustrating aspects of a site selection operation.
Figure 10:
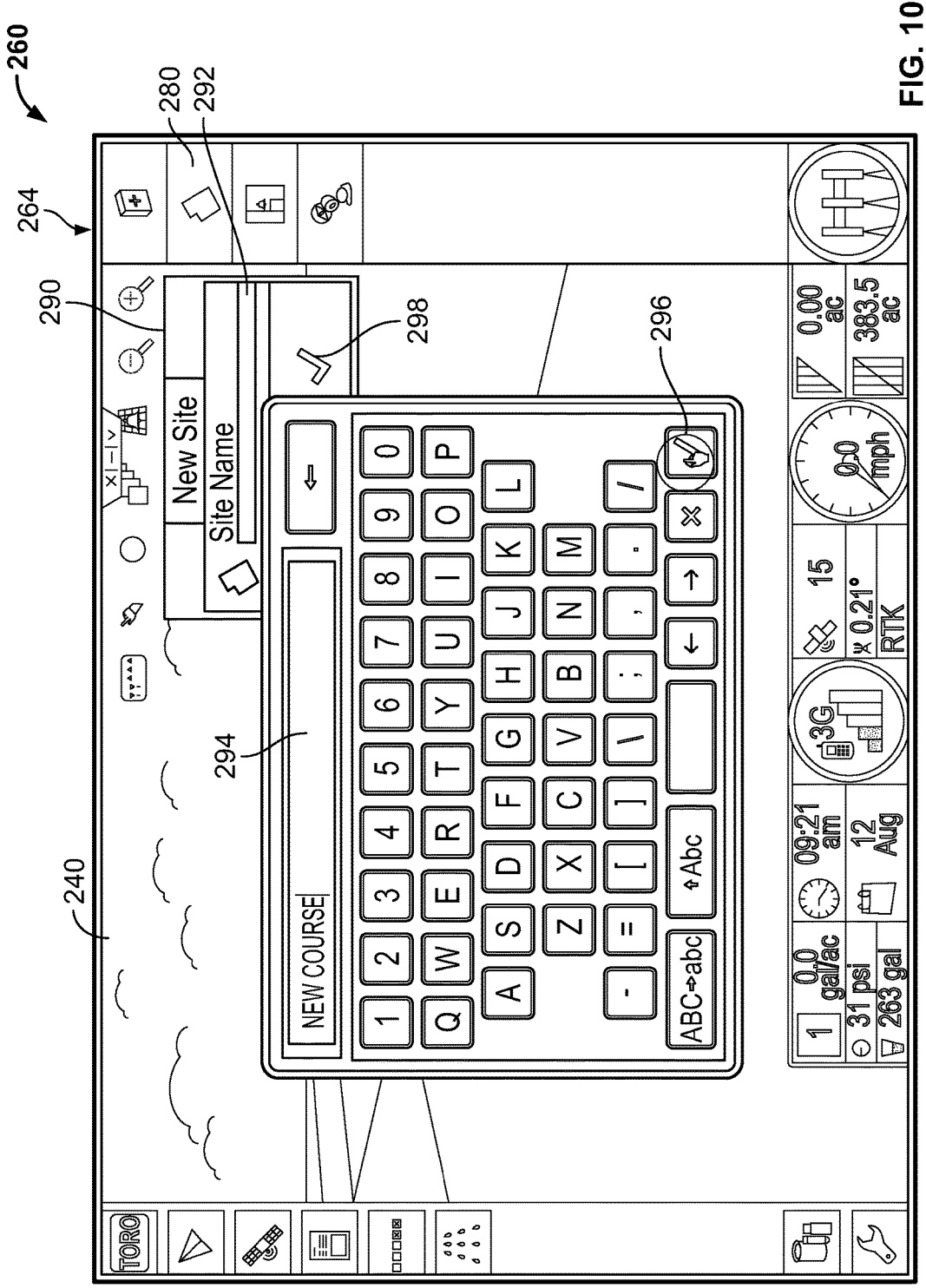
FIG. 10 is another screen shot illustrating additional aspects of a site selection operation.

FIGS. 9-10 illustrate an example of the operation 252 shown in FIG. 8, in which a site is selected. In this example, the operation 252 is performed by the control system 110.

FIG. 9 is a screen shot 260 of the graphical user interface 240 during the site selection operation 252. In this example, the graphical user interface 240 includes a menu selection bar 262, a menu selection bar 264, a sub-menu 266, a graphical site display 268, a dashboard display 270, and a spray control option 272. The graphical site display 268 includes a mobile turf sprayer icon 274. The graphical user interface 240 is generated, for example, by the computing device 150 on the touch sensitive display 154 as shown in FIGS. 5-7.

The site selection operation 252 is initiated, in this example, by the operator selecting a site option 280 from the menu selection bar 264, which causes the display of the sub-menu 266, and then selecting a new site option 282 from the sub-menu.

FIG. 10 is another screen shot of the graphical user interface 240 during the site selection operation 252, following the selection of the new site option 282 shown in FIG. 9. In this example, the user interface 240 includes a new site window 290, a site name field 292, and a data entry window 294.

After the user has selected the new site option to initiate the selection of a new site, the new site window 290 is displayed that prompts the user to enter a site name into the site name field 292. Upon selecting the site name field 292 the data entry window 294 is displayed to allow the user to enter the site name (e.g., "NEW COURSE"). When completed, the user selects the enter option 296, and then the enter option 298 to complete the creation and selection of the new site.

FIGS. 11-16 illustrate an example of the operation 254, shown in FIG. 8, which operates to identify regions of the site.

Figure 11:
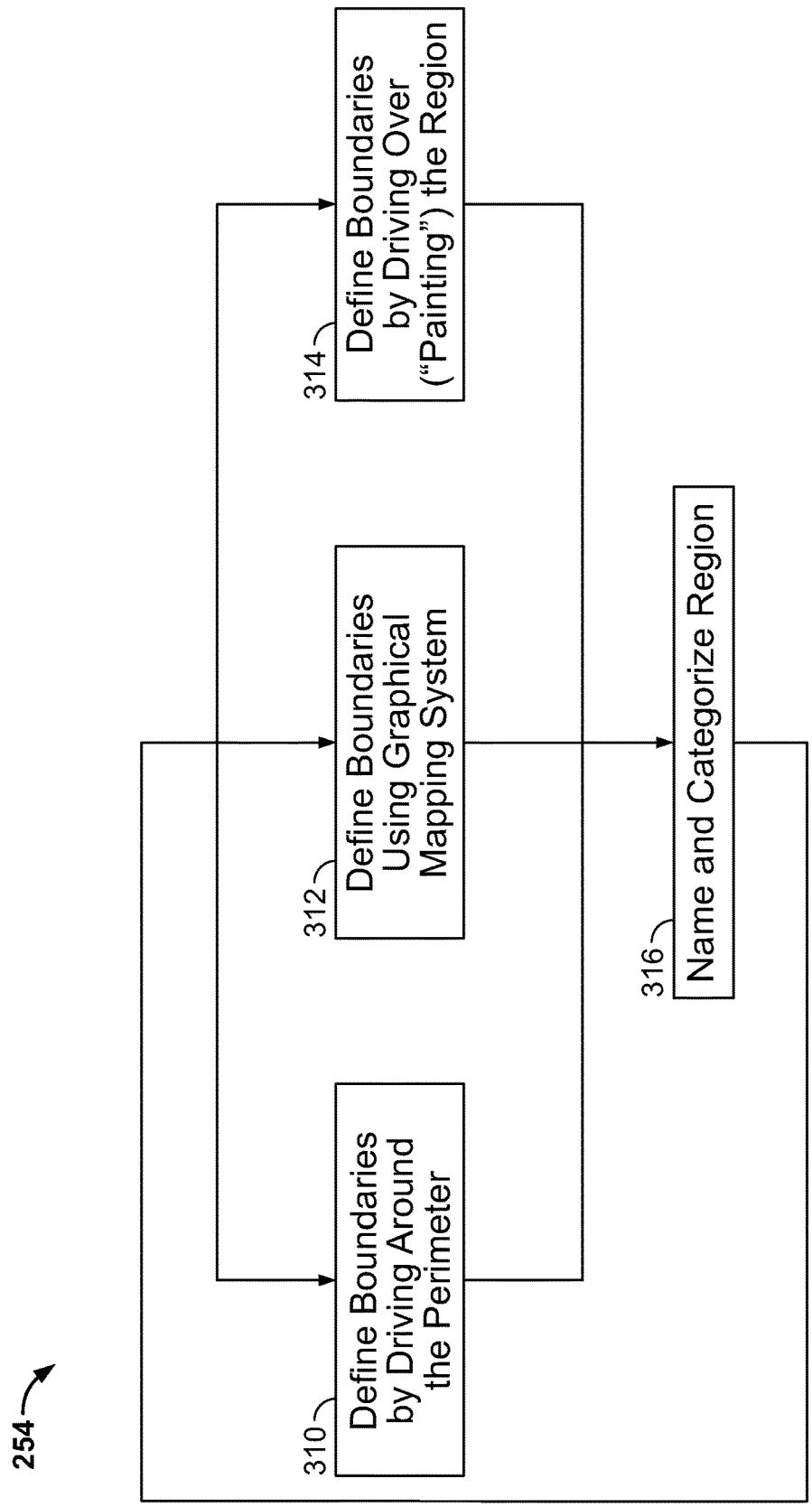
FIG. 11 is a flow chart illustrating the identification of regions of a site.

FIG. 11 is a flow chart illustrating an example of the operation 254 for identifying regions of a site. In this example, the operation 254 includes operations 310, 312, 314, and 316.

This example shows several options for identifying the locations of the various regions of a site.

Figure 12:
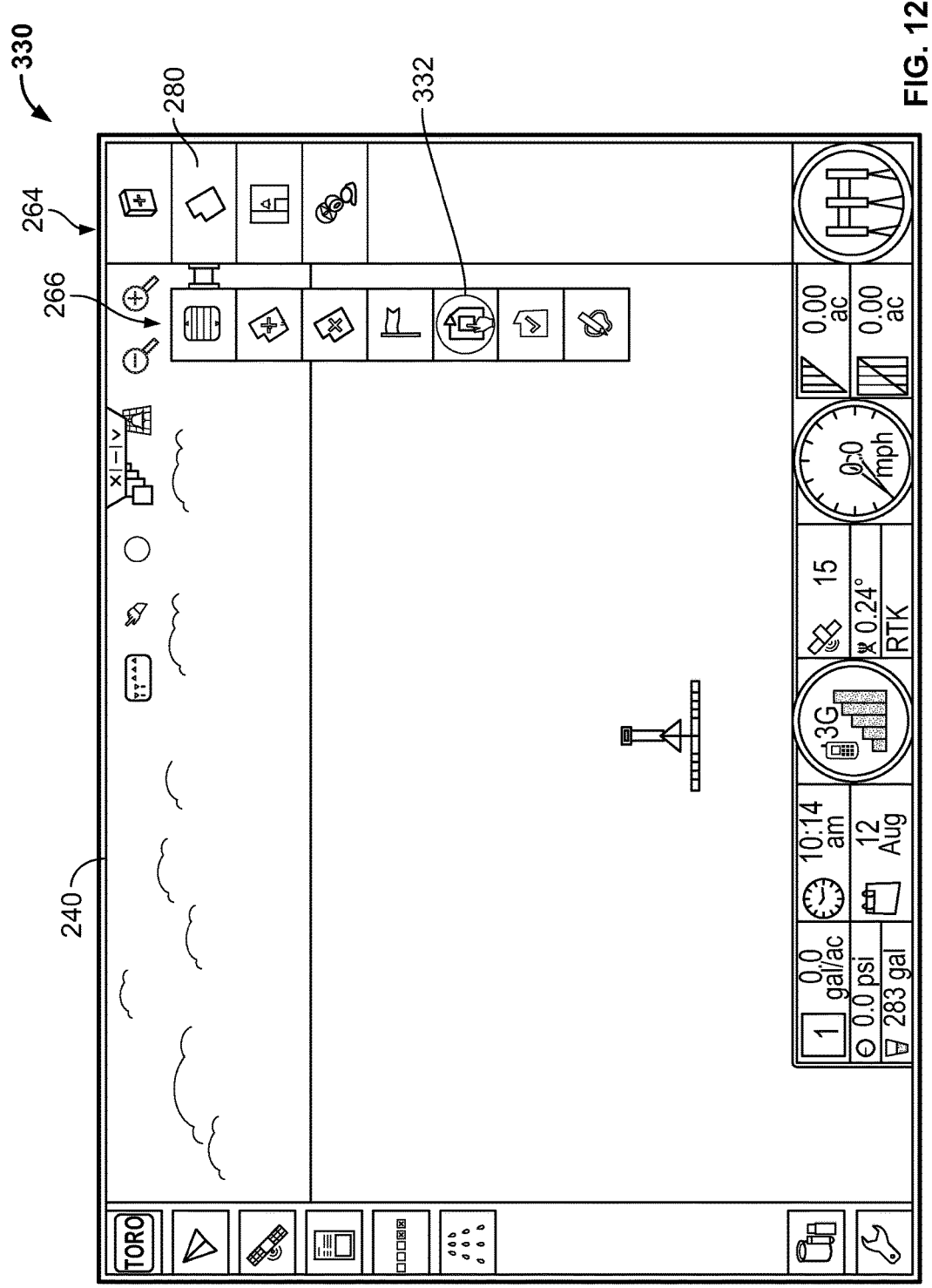
FIG. 12 is a screen shot illustrating the initiation of a boundary definition function of a control system.
Figure 13:
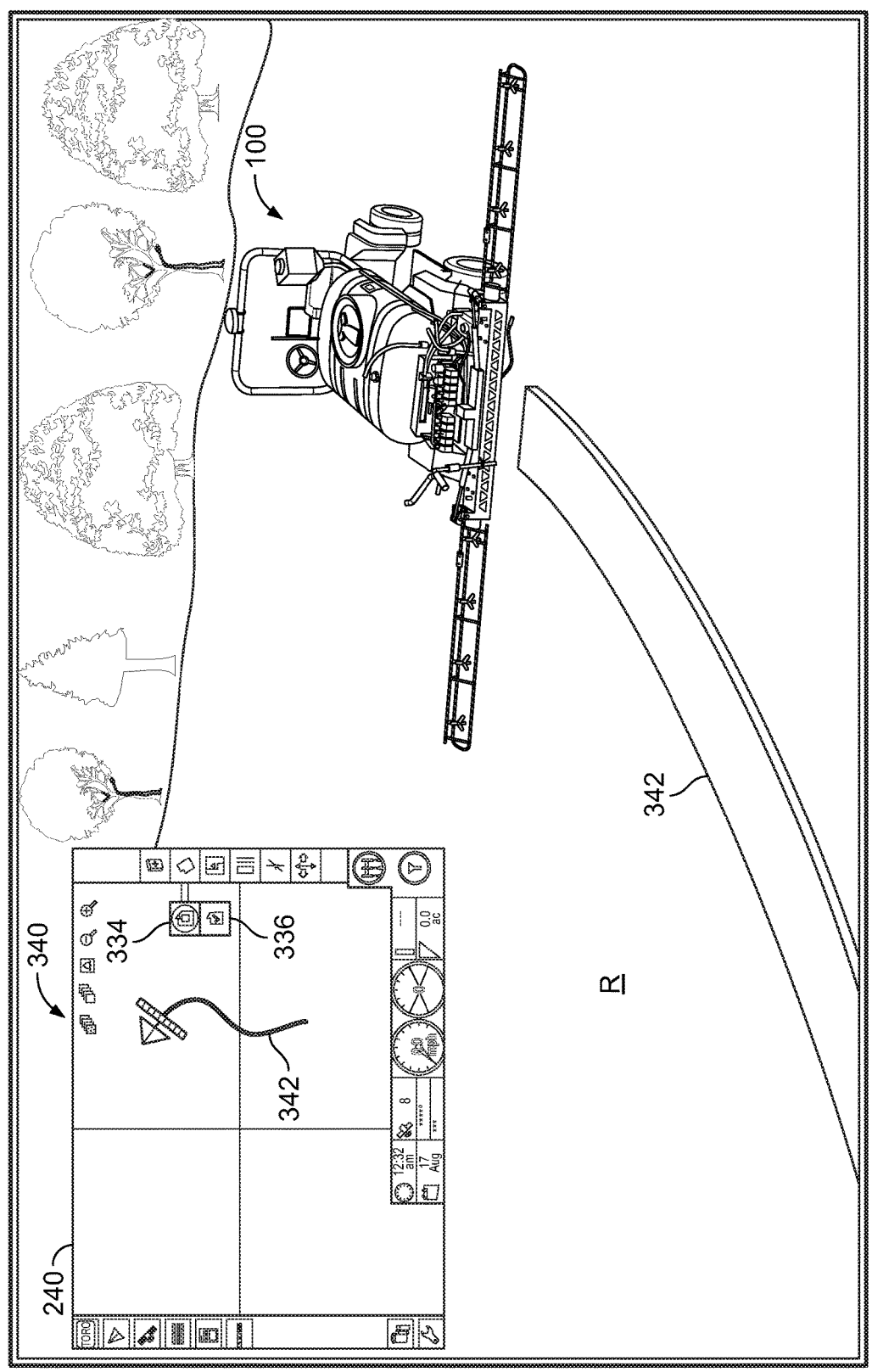
FIG. 13 is a schematic diagram depicting a perspective view of the mobile turf sprayer on a site, as well as a screen shot of a user interface illustrating the definition of a boundary around a region of a site.

A first option is performed in operation 310, in which a boundary of a region is defined by driving the mobile turf sprayer around a perimeter of the region, while the mobile spray vehicle tracks the location of the vehicle. An example of the operation 310 is illustrated in FIGS. 12-13.

Figure 14:
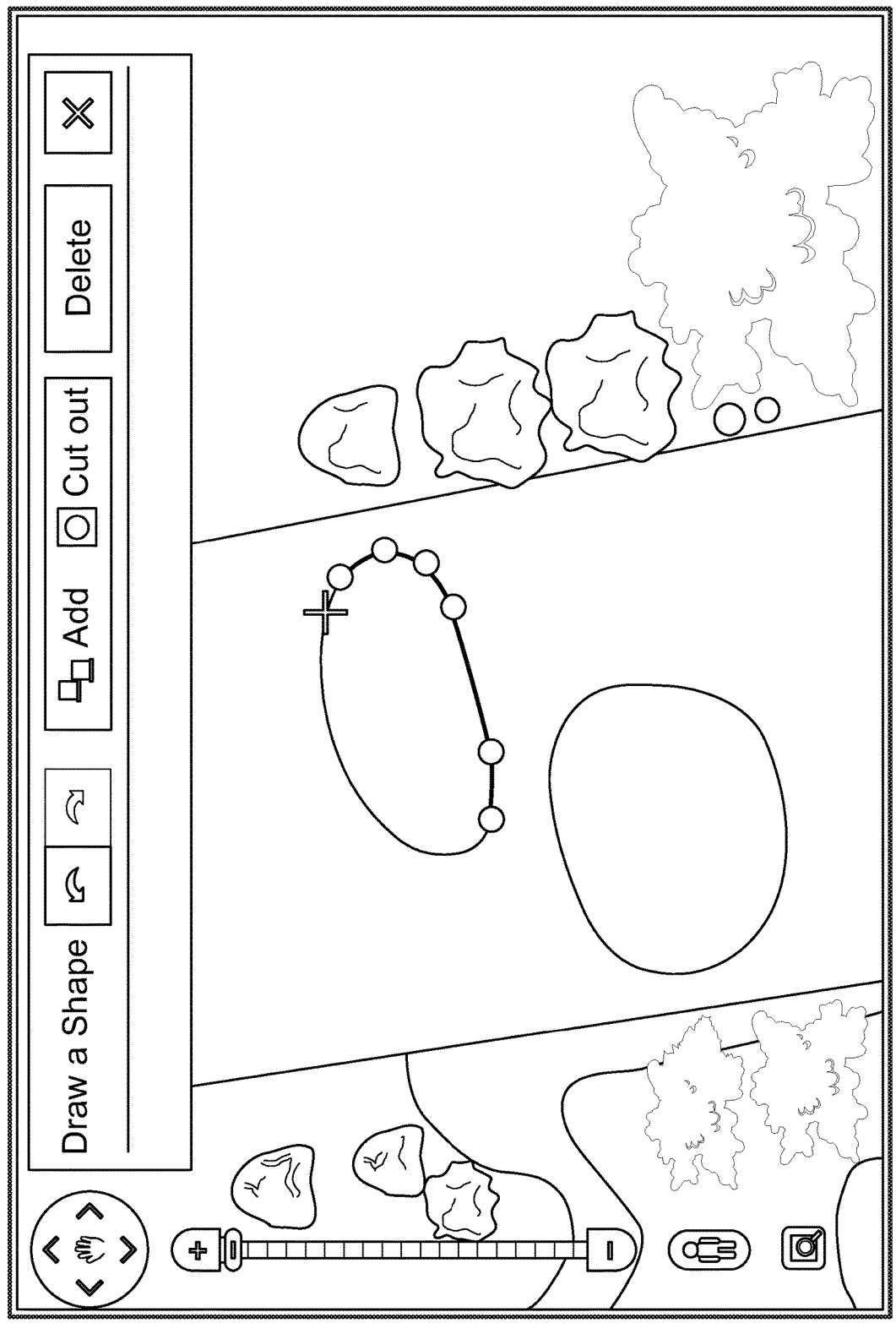
FIG. 14 illustrates an example of an operation in which a graphical mapping system is used to define boundaries of a region.

A second option is performed in operation 312, in which a graphical mapping system is used to define the boundaries. An example of operation 312 is illustrated in FIG. 14.

Figure 15:
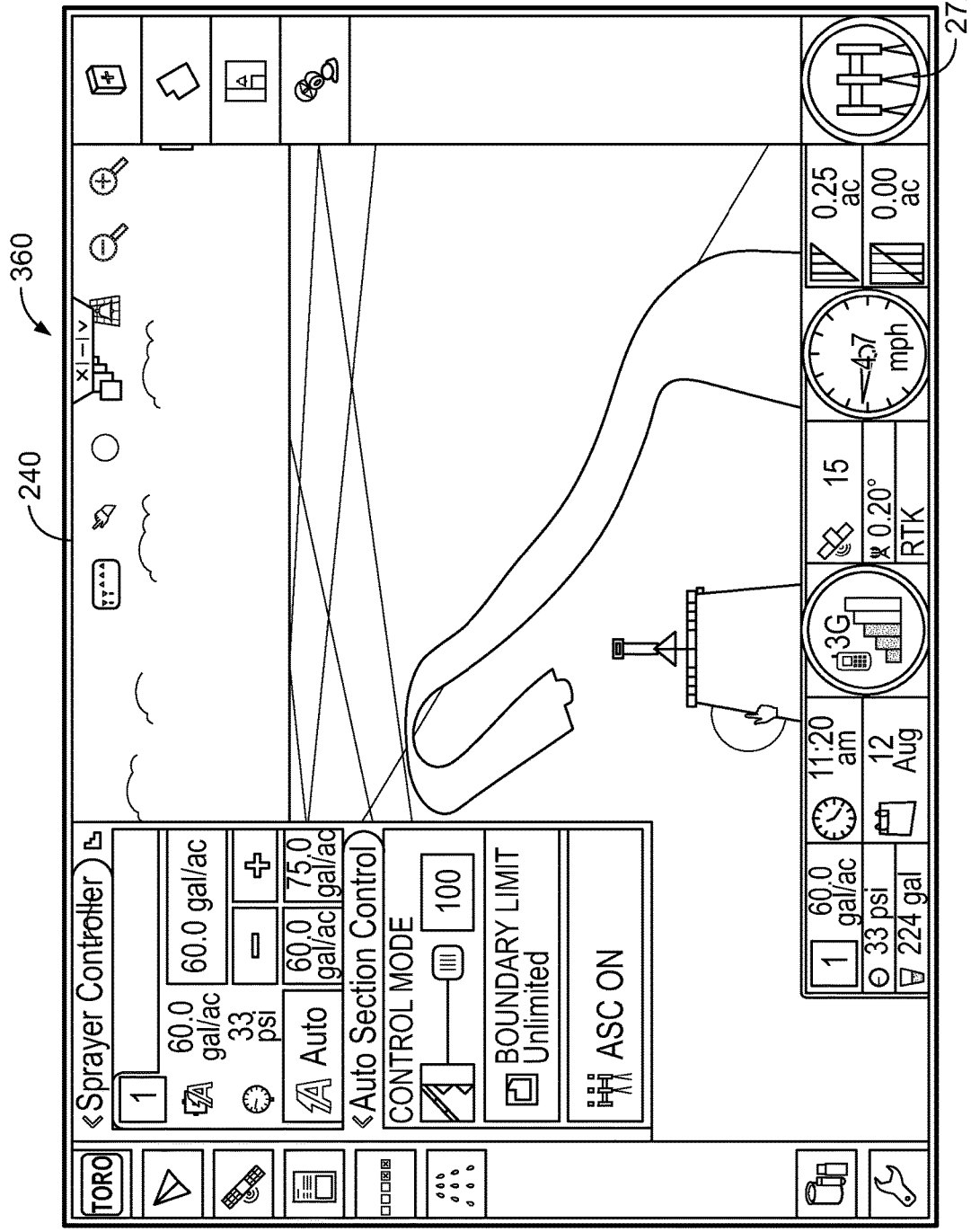
FIG. 15 is another screen shot illustrating an example in which a region is defined by driving over portions of a site.

A third option is performed in operation 314. In this operation 314, rather than driving entirely around a perimeter of a region, a region can be defined by driving over the region. This process can be referred to as painting the region, because it can be done while spraying, in which case any portion that is sprayed during this operation can be included within the bounds of the defined region. An example of operation 314 is illustrated in FIG. 15.

Figure 16:
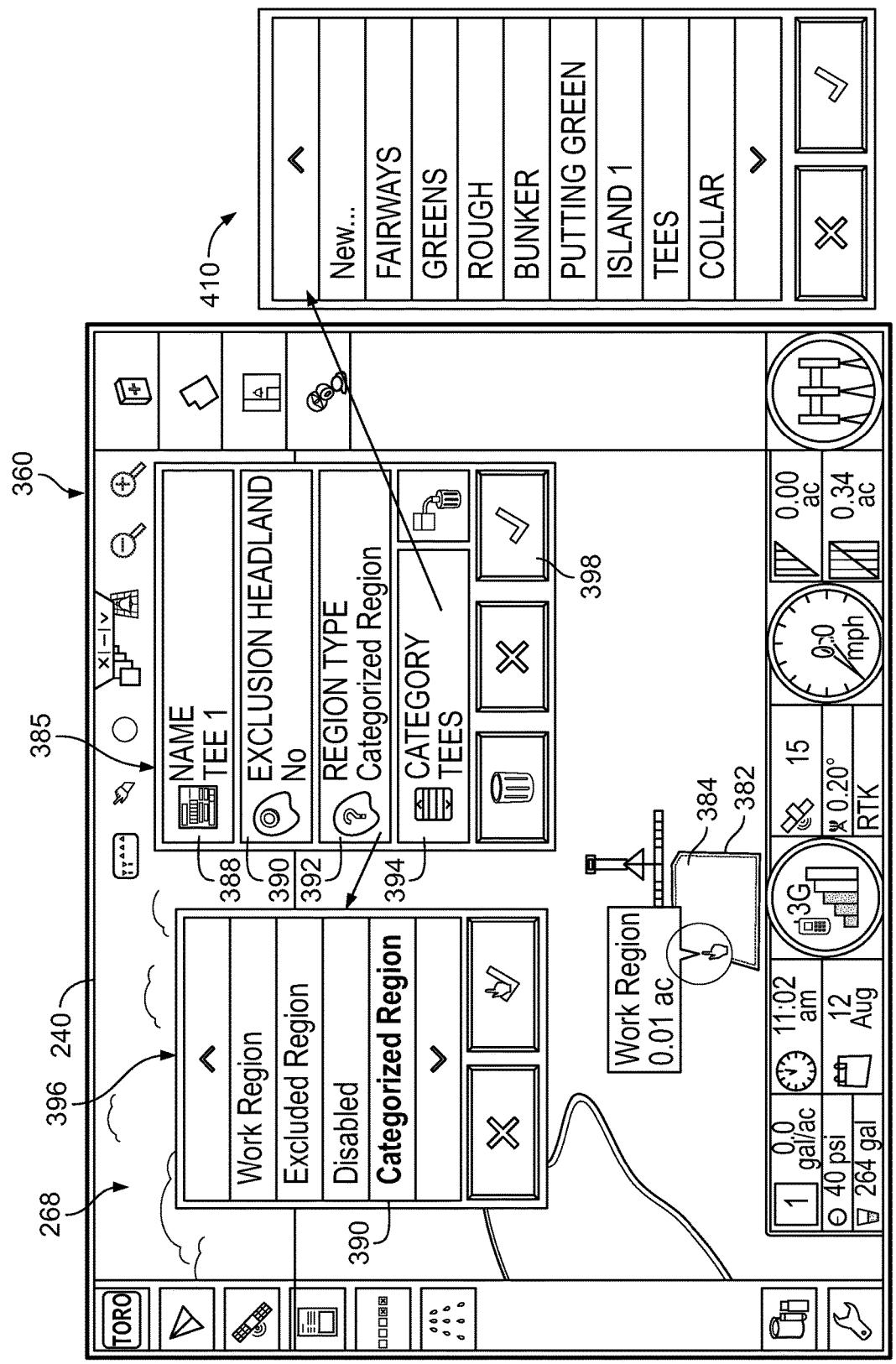
FIG. 16 is a screen shot illustrating an example in which a region is named and categorized.

Once a region has been defined, operation 316 is performed to name and categorize the region. An example of operation 316 is illustrated in FIG. 16.

The operation 254 is repeated until all desired regions of the turf site S have been defined, named, and categorized.

FIGS. 12-13 illustrate an example of the operation 310 as shown in FIG. 11, in which boundaries are defined by driving around the perimeter of the region.

FIG. 12 is a screen shot 330 of the user interface 240 illustrating the initiation of a boundary definition function of the control system 110.

In this example, to initiate the boundary definition function, the operator selects the site option 280 from the menu selection bar 264, and then selects the boundary definition option 332.

FIG. 13 is a schematic diagram depicting a perspective view of the mobile turf sprayer 100 on a site S, as well as a screen shot 340 of the user interface 240. FIG. 13 illustrates the definition of a boundary 342 around a region R of the site S.

Once the boundary definition option 332 is selected, the operator then drives the mobile turf sprayer 100 to an edge of the region to be defined. In one example, the mobile turf sprayer 100 uses as a reference point the outer edge of the left front wheel, because this point is easily monitored by the operator while driving the mobile turf sprayer 100, and because it comes in direct contact with the ground, it can be precisely controlled to the location of the edge of the region.

When ready to begin, the operator selects the start/pause option 334. The operator then drives the mobile turf sprayer 100 around the perimeter of the region. Meanwhile, the mobile turf sprayer 100 tracks the location of the mobile turf sprayer 100 (and more specifically, the reference point) and uses the collected location data to generate boundary data defining the boundary 342 around the region. When done, the operator selects the done option 336. The region R is then created and stored in the control system for the site S based on the defined boundary 342.

If needed, the operator can temporarily pause the location tracking and boundary definition function, to allow the operator to move the mobile turf sprayer 100 without defining the boundary according to the movement. For example, in order to create a sharp corner the operator can drive in one direction until the corner is reached, then pause the boundary definition function by selecting the start/pause option 334 to allow the operator to turn the mobile turf sprayer around so it is facing the proper direction. The boundary definition function is then resumed from that position.

FIG. 14 illustrates an example of operation 312, shown in FIG. 11, in which a graphical mapping system is used to define the boundaries of the region using the computing device 150, or another computing device (such as in a home or office). In this example a graphical mapping system, such as using the Google Earth mapping system, is used to generate a graphical display of the site S. The graphical display can include satellite or aerial imagery for example. A boundary definition tool of the mapping system is used to draw or otherwise define the boundary around the desired region. A freeform drawing tool can be used, or a polygon tool, for example. Once the boundary is defined, the boundary data is used to define the region.

FIG. 15 is another screen shot 360 of the user interface 240 illustrating an example of operation 314, shown in FIG. 11, in which a region is defined by driving over the region. A primary different between operation 314 and operation 310 is that the operation 310 defines a line that forms a perimeter of a boundary. In contrast, operation 314 defines the region by an area over which the mobile turf sprayer passes. If spraying at this time, the region is defined by any portion of the site that is sprayed during the operation. More specifically, the area is defined by a starting point, a specified width, a path of movement of the mobile turf sprayer, and an ending point. The specified width can be, for example, the distance between the most distal spray nozzles 146 on the boom 144 (FIG. 5). Starting and ending points can be defined by toggling the spray control option 272, which also simultaneously starts or stops the spraying, in some embodiments.

FIG. 16 is a screen shot 380 of the user interface 240 illustrating an example of operation 316, shown in FIG. 11, in which a region is named and categorized.

In this example, the boundaries 382 of a region 384 have been defined, such as using the process discussed above, and the region 384 and boundaries 382 thereof are graphically displayed in the graphical site display 268. FIG. 16 illustrates how that region 384 can be named and categorized.

If the region 384 is not already selected, the region 384 can be selected by tapping on the region on the touch sensitive display, or by using another pointing device to tap on the region in the graphical site display 268. Alternatively, the region 384 can be selected from a list of regions that can be accessed through the menus and selectable options, not shown. Once selected, a preview window is displayed that shows the current name or region type, and can also show additional details about the region, such as the total area of that region (e.g., 0.01 acres).

An edit region menu 385 is then displayed in the user interface 240. In this example the boundary menu 386 includes name option 388, exclusion headland option 390, region type option 392, and category option 394.

To assign a name to the region, the name option 388 is selected, and the name is then entered (similar to the process shown in FIG. 10). In this example, the region is named "Tee 1" indicating that it is the tee box on the first hole.

In some embodiments the edit region menu 385 includes an exclusion headland option 390 that can be toggled on or off to indicate whether this region is a headland that should be excluded from spraying. In this example the region is not an exclusion headland.

To classify the region, the region type option 392 is selected, which causes the submenu 396 to be displayed. The submenu 396 allows the operator to select a region type such as work region, excluded region, disabled, or categorized region. For a categorized region, the operator selects option 390 which allows the operator to further define the region type.

In some embodiments, the work region is a region that can be sprayed, such as all non-excluded and non-disabled regions. An excluded region is a region that should always be excluded from spraying. A disabled region is a region that should be temporarily excluded from spraying (such as due to other maintenance being performed in that area).

When option 390 is selected the category option 394 is displayed in the edit region menu 385, which displays the currently selected region type (e.g., "tees"). Selection of the category option 394 causes the display of the submenu 410, in which a list of available region type categories is displayed. In the example of a golf course, the categories can include, for example, fairways, greens, rough, bunker, putting green, island, tees, collar, and the like. In this example the Tees category is selected.

After editing or defining the region data has been completed, the enter option 398 is selected to store the region data in a computer readable data storage for the region 384. The region data includes, for example, the boundaries 382 of the region 384, the name of the region 384, and the region type (including the region type category).

Figure 17:
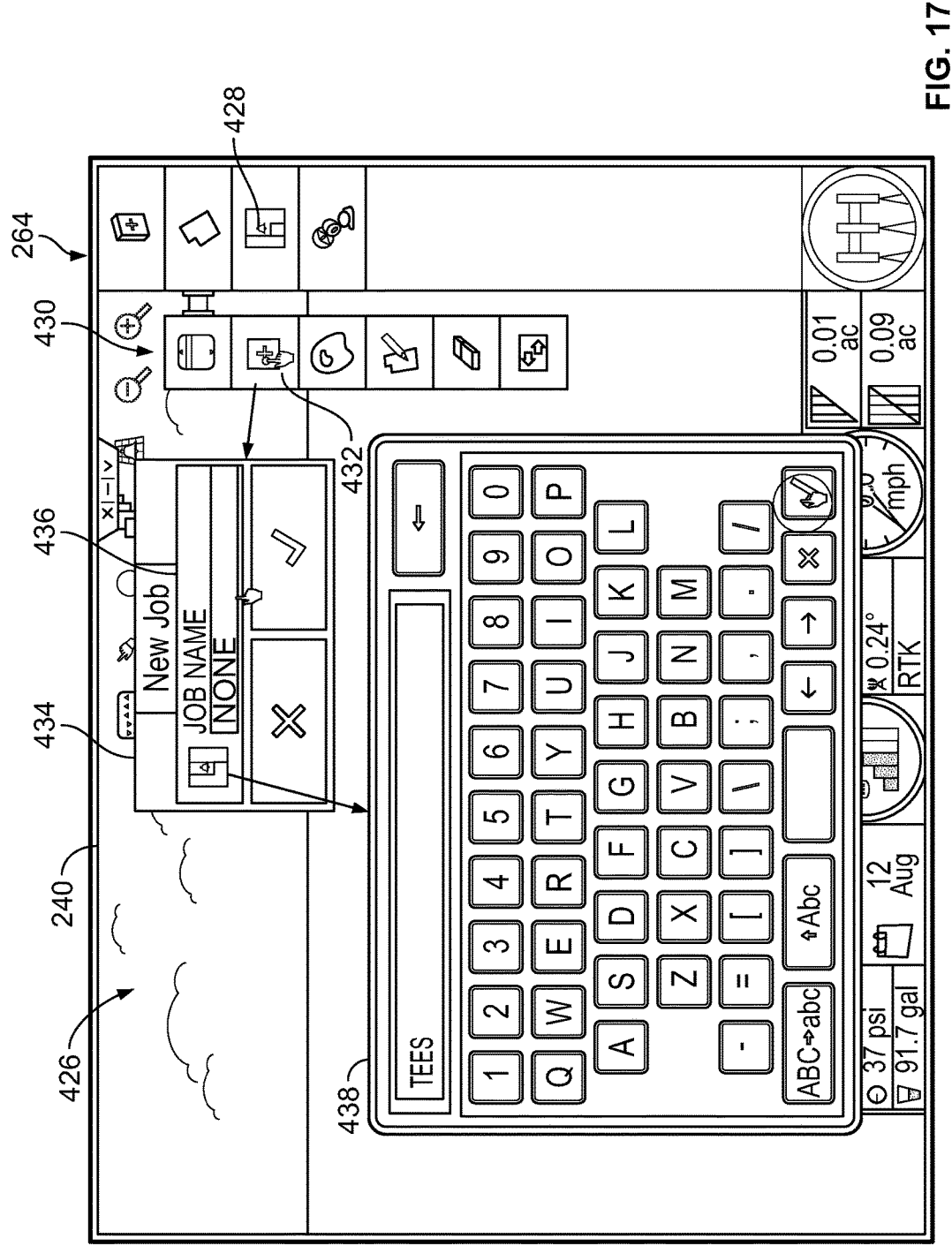
FIG. 17 is a screen shot illustrating a job setup operation.
Figure 18:
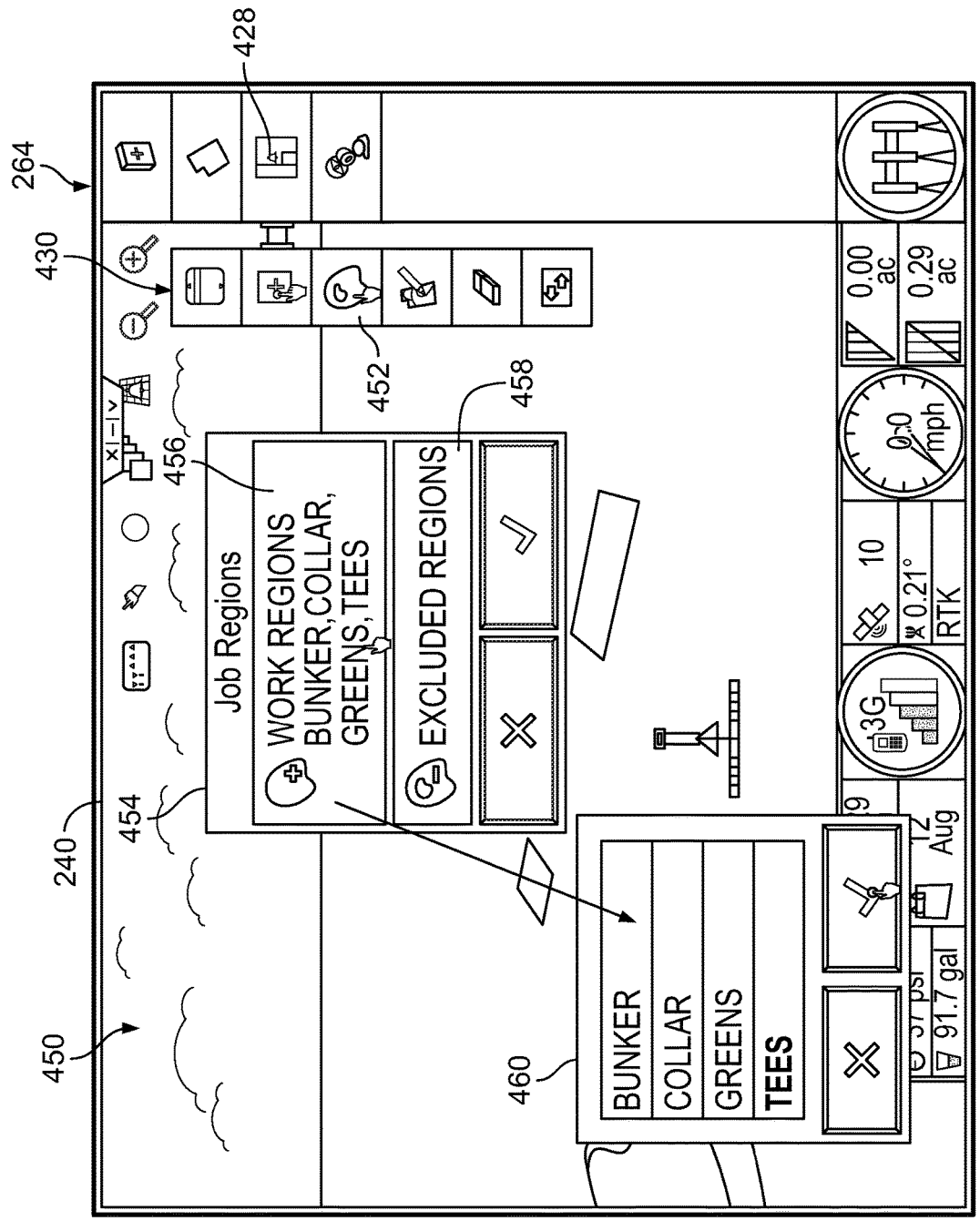
FIG. 18 is another screen shot illustrating additional aspects of a job setup operation.
Figure 19:
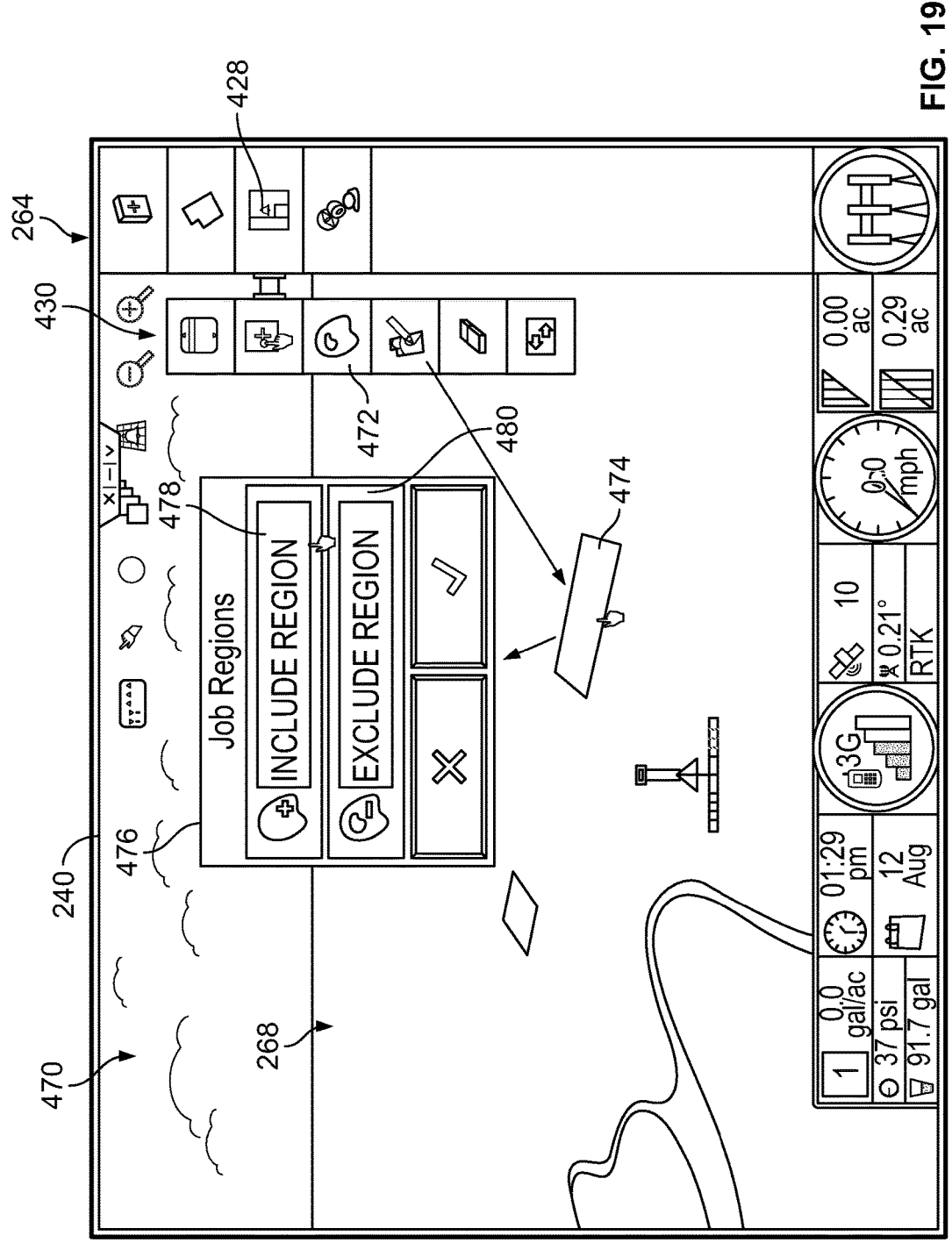
FIG. 19 is another screen shot illustrating additional aspects of the job setup operation.

FIGS. 17-19 illustrate an example of the operation 256, shown in FIG. 8, in which a spray job is setup to include a plurality of regions to be sprayed.

FIG. 17 is a screen shot 426 of the example user interface 240 during the job setup operation 256.

To initiate the setup of a new job, in this example, a job option 428 is selected from the menu selection bar 264. The submenu 430 is then displayed which provides a set of additional options relating to the job functionality. A new job option 432 is selected to generate a new job. Alternatively, a previously defined and saved job can be opened.

The new job menu 424 is then displayed which shows the current job name for the job. A job name can be added by selecting the job name option 436, and entered through the data entry window 438.

In this example, the operator has been instructed to spray all of the Tee boxes for the course today, and therefore the operator enters the job name of "Tees." The operator confirms the entries and then selects the Enter options to save the new job and continue defining the job.

At this point the job name is saved. In some embodiments new jobs are initially empty, and therefore the operator must proceed to identify what regions of the course should be included in this job, as shown in FIG. 18. In another possible embodiment, all work regions may be initially included in a new job by default, and the operator can edit the regions included in the job if the operator does not wish to spray all work regions.

FIG. 18 is another screen shot 450 of the example user interface 240 during the job setup operation 256.

After a job has been generated, the job option 428 can again be selected from the menu selection bar 264 to display the job submenu 430 (if not already visible in the user interface 240) 430. The regions option 452 is then selected to identifying a plurality of regions of a turf site to be included in the spray job (option and display 456), and optionally to identify any regions that should be excluded from the job (option and display 458).

The job regions menu 454 is displayed, which provides a display of the regions that are currently selected for inclusion in the job, and those regions that are currently excluded. For example, the menu 454 shows that all regions having a region type category of bunker, collar, greens, and tees are currently included in the job.

To add, remove, or edit the regions included in the job, the work regions option 456 is selected, which causes the display of the region type selection menu 460. The region type selection menu 460 displays a selectable list of region types (and more specifically, region type categories) that are currently defined in the site. In this example the region types include Bunker, Collar, Greens, and Tees. Therefore, the operator ensures that the Tees region type is selected, and deselects each of the other region types (Bunker, Collar, and Greens) to remove those region types from the job.

The operator then confirms the information and selects the enter options to complete the identification of the regions to be included in the job. The job data for the active job is then updated and saved to automatically include all regions associated with the selected region type (or region type category). In this example, all 18 tee boxes present at the active site are automatically included in the job. Therefore, by previously associating regions with a region type, the job setup process is greatly simplified and allows the operator to make only one selection of a region type, rather than having to select each individual region.

Additionally, the excluded regions option 458 can also be selected if desired to identify any regions or region types to be excluded from the job.

FIG. 19 is another screen shot 470 of the example user interface 240 during the job setup operation 256.

In some cases the operator may wish to select individual regions for inclusion or exclusion from a job. For example, the operator may wish to exclude one of the tee boxes added to the job discussed above, or the operator may wish to add an additional region. To do so, the operator selects the job option 428 and then the map selection option 472. The operator can then select the desired region, such as region 474. In some embodiments, selection of the region 474 involves tapping on the touch sensitive display at a point within the graphical display of the region 474 in the graphical site display 268. Other pointer inputs can also be used to select the region 474 in the user interface.

The job region selection menu 476 is then displayed, which includes the include option 478 and the exclude option 480. To include the selected region 474 in the currently active job, the include option 478 is selected. To exclude it, the exclude option 480 is selected. In this way any one or more regions can be manually selected one at a time for inclusion or exclusion from the job. In addition to the graphical selection of the regions as shown in FIG. 19, regions can also be added to or removed from a job using text-based list or menu of regions in some embodiments.

Figure 20:
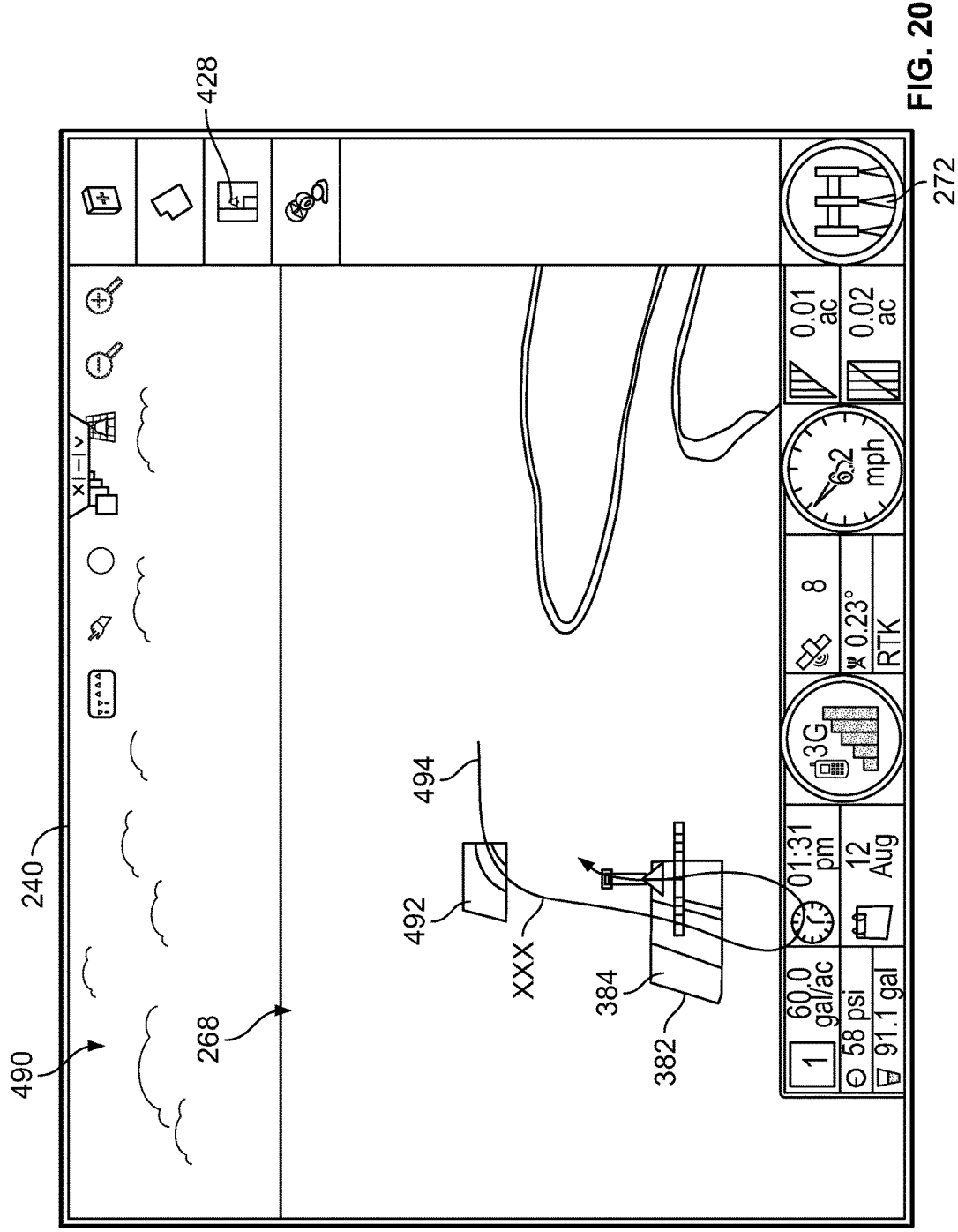
FIG. 20 is a screen shot illustrating an example in which the mobile turf sprayer sprays the plurality of regions in the job during a spraying operation.

FIG. 20 illustrates an example of the operation 258, shown in FIG. 8, in which the mobile turf sprayer sprays the plurality of regions in the job. FIG. 20 is a screen shot 490 of the example user interface 240 during the spraying operation 258.

Once the spray job has been setup to include all of the desired regions, and optionally to exclude any desired regions, operation 258 is then performed to spray the regions in the job.

If the job is not active, the job can be selected using the job option 428 and selecting the desired job by job name. If the job is still active from the prior steps, then it does not have to be re-selected.

To begin the spray job, the operator activates the spraying operation 258 by selecting the spray control option 272. Upon selection of this option, the mobile turf sprayer begins monitoring the location of the mobile turf sprayer 100, and more particularly the locations of the spray nozzles 146, and is ready for spraying the selected regions in the job. In this example, two regions 384 and 492 of the active job are shown in the graphical site display 268.

The operator then drives the mobile turf sprayer 100 about the site to one of the selected regions. For illustrative purposes, a path 494 that the mobile turf sprayer 100 takes across the regions 384 and 492 is shown. First, the mobile turf sprayer 100 approaches the region 492, and cuts across a corner of it. As soon as the spray nozzles cross a boundary of the region 492 and are positioned above and within the region 492, the spray system 106 is activated and product is sprayed through the respective nozzles onto the region. The control system 110 tracks what portion of the region 492 has been sprayed, and what portion remains unsprayed. In this example, graphical site display 268 uses a color coding to graphically depict the sprayed and the unsprayed portions of the region 492. The sprayed portions are displayed in a first color (e.g., green), and the unsprayed portions are displayed in a second color (e.g., grey).

After making a single pass across region 492, the operator then decides to move to a different region. As one example, the operator might notice a group of golfers approaching the tee box of region 492, and so the operator decides to move to a presently unoccupied part of the course to continue spraying. Therefore, the mobile turf sprayer 100 takes the path 494 to the region 384, and passes over that region. Once again, as soon as the spray nozzles 146 pass the boundary 382 and are positioned over the region 384, the spray system 106 is activated and product is sprayed from the spray nozzles 146 onto the site. Similarly, as soon as the spray nozzles 146 pass the boundary 382 and are positioned outside of the region 384, the spray system 106 deactivates the spraying through those nozzles 146 that are outside of the boundary.

If the spray nozzle enters a region within the active job that has already been sprayed, the mobile turf sprayer inhibits the spraying as the spray nozzle passes over the sprayed portion. This avoids wasting product and over application of the product, but also allows the operator to quickly move the mobile turf sprayer 100 across the regions without having to worry about whether certain areas have already been sprayed, and without having to carefully maneuver the spray vehicle so as to avoid making a second pass across an already sprayed portion of the job.

In this manner the operator is free to drive the mobile turf sprayer 100 about the site in whatever path is desired, and the mobile turf sprayer 100 will continue to spray the regions in whatever order the operator chooses, so long as the regions are included in the active job.

When the mobile turf sprayer moves from one region to another region within the same job, the operator is not required to provide any inputs into the control system 110. For example, the operator does not have to tell the control system 110 when the operator decides to leave one region and move to another region. Similarly, the operator does not have to switch between multiple jobs, and does not have to manually select each region individually as the operator moves between regions. Instead, the operator is free to focus on the task at hand, and the mobile turf sprayer 100 continues to monitor the current location, activate and deactivate spraying as defined for the current job to spray the selected regions, and track the sprayed portions and unsprayed portions for the plurality of regions in the job.

Another aspect of the present disclosure involves a selected nozzle display. In some embodiments a selected nozzle display is displayed upon selection of at least one of a region and a job. When the region or the job is selected, the selected nozzle display identifies a nozzle type that is associated with the region or the job. In some embodiments the selected nozzle display shows a graphical representation the selected nozzle. In some embodiments the nozzles are color coded by type. In this way the operator can quickly and easily look at the selected nozzle display and compare the selected nozzle and color shown on the display with the nozzle that is currently installed for use on the mobile turf sprayer. If they do not match, the operator can either change the nozzle to the one shown on the display, or can select the selected nozzle display to change the selected nozzle to a different nozzle type.

Another aspect of the present disclosure involves embodiments that provide at least two modes of operation for the mobile turf sprayer 100. A first mode of operation provides full access to a complete set of options and functions that can be performed through the user interface of the control system 110, whereas a second mode of operation provides access to a reduced set of options and functions.

In some embodiments the modes of operation are associated with users based on user roles. For example, a site superintendent has a username that is associated with a superintendent role, whereas a maintenance technician has a username that is associated with a technician role. When users associated with the superintendent role login, the control system 110 operates in the first mode, and when users associated with the technician role login, the control system 110 operates in the second mode.

In some embodiments, the first mode provides additional setup functions, such as to allow the superintendent to define boundaries, generate regions, add and edit spray products, define or adjust flow rates associated with products, define or adjust products or flow rates associated with regions or region types, and the like. In some embodiments the superintendent may not want to allow the technician to make changes to these settings, and therefore the second mode does not provide access to those options or functions. In some embodiments the specific options and functions that are available in the first mode and the second mode are selectable by the superintendent.

One example involves generating a first user interface for a first user on a display device using a computing device, the first user interface providing a set of selectable options, the selectable options being associated with a set of available functions; and generating a second user interface for a second user on the display device using the computing device, the second user interface providing a reduced set of selectable options, the reduced set of selectable options being associated with a reduced set of available functions.

In some embodiments the set of available functions includes: defining boundaries of regions, adjusting calibration settings, adjusting flow meter settings, adding new spray products, adjusting spray overlap settings, creating a new job, selecting an existing job, selecting a product, and selecting a product flow rate, whereas the reduced set of available functions includes at least one of: creating a new job, selecting an existing job, selecting a product, and selecting a product flow rate.

As discussed above, for ease of description the present disclosure makes reference to example embodiments involving a mobile turf sprayer that sprays a turf site, but other embodiments involve other mobile treatment devices that provide other treatments.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of spraying a turf site using a mobile turf sprayer, the method comprising:

identifying a plurality of regions of a turf site to be sprayed with the mobile turf sprayer, at least some of the plurality of regions being separated from each other;

determining a location of the mobile turf sprayer as it moves about the turf site;

determining that the mobile turf sprayer is located at an unsprayed portion of at least one of the plurality of regions;

automatically spraying the unsprayed portion of the at least one of the plurality of regions as the mobile turf sprayer moves about the turf site;

generating a first user interface for a first user on a display device using a computing device, the first user interface providing a set of selectable options, the selectable options being associated with a set of available functions; and generating a second user interface for a second user on the display device using the computing device, the second user interface providing a reduced set of selectable options, the reduced set of selectable options being associated with a reduced set of available functions, wherein the set of available functions are configured to control the reduced set of available functions.

2. The method of claim 1, further comprising:
determining that the mobile turf sprayer is located at an unsprayed portion of a second region of the plurality of regions; and
automatically spraying the unsprayed portion of the second region.

3. The method of claim 1, wherein the plurality of regions are included in a single job, such that automatic spraying occurs without requiring any user input as the mobile turf sprayer moves across the plurality of regions.

4. The method of claim 1, further comprising tracking the location of the mobile turf sprayer as it moves about edges of the regions to identify boundaries of the regions before identifying the plurality of regions of the turf site to be sprayed.

5. The method of claim 1, further comprising displaying a graphical representation of at least a portion of the turf site using the computing device and receiving inputs from a user identifying boundaries of the regions before identifying the plurality of regions of the turf site to be sprayed.

6. The method of claim 1, wherein identifying a plurality of regions of the turf site to be sprayed further comprises:
associating each region with a region type;
defining a new job;
receiving a selection of a region type; and
automatically adding all regions associated with the selected region type to the job.

7. The method of claim 6, wherein the selected region type is one of a tee box, a fairway, a green, a rough, and a collar, and wherein selection of the region type automatically selects all of the regions of that region type across the entire turf site.

8. The method of claim 6, further comprising identifying at least one excluded region of the turf site for the job; and automatically inhibiting spraying of the excluded region by a spray nozzle when the spray nozzle is positioned over the excluded region.

9. The method of claim 1, wherein the set of available functions includes: defining boundaries of regions, adjusting calibration settings, adjusting flow meter settings, adding new spray products, adjusting spray overlap settings, creating a new job, selecting an existing job, selecting a product, and selecting a product flow rate.

10. The method of claim 9, wherein the reduced set of available functions includes at least one of: creating a new job, selecting an existing job, selecting a product, and selecting a product flow rate.

11. The method of claim 1, wherein identifying a plurality of regions of the turf site to be sprayed further comprises:
defining a new job;
generating a user interface using the computing device, the user interface including graphical representations of at least some of the regions of the turf site;
receiving selections of at least some of the regions in the user interface; and
adding the selected regions to the job.

12. The method of claim 11, wherein the display device comprises a touch sensitive display and the user interface is displayed on the touch sensitive display, and wherein the selections are received by the touch sensitive display at the locations where the regions are displayed on the touch sensitive display.

13. A mobile turf sprayer for spraying a turf site, the mobile turf sprayer comprising:
a tank for holding a product to be sprayed;
a spray system including a plurality of nozzles, the spray system configured to supply the product from the tank to the nozzles for application to a turf site;
positioning system electronics configured to receive signals usable to determine a location of the mobile turf sprayer; and
a computing device including at least a processing device and a computer readable storage device, the computing device in data communication with the positioning system electronics and operable to control the spray system, the computer readable storage device storing data instructions executable by the computing device to cause the computing device to:
identify a plurality of regions of a turf site to be sprayed with the mobile turf sprayer, at least some of the regions being separated from each other;
determine a location of the mobile turf sprayer as it moves about the turf site using the positioning system electronics;
determine that the mobile turf sprayer is located at an unsprayed portion of at least one of the regions;
automatically spray the unsprayed portion of the at least one of the regions using the spray system as the mobile turf sprayer moves about the turf site;
generate a first user interface for a first user on a display device using a computing device, the first user interface providing a set of selectable options, the selectable options being associated with a set of available functions; and
generate a second user interface for a second user on the display device using the computing device, the second user interface providing a reduced set of selectable options, the reduced set of selectable options being associated with a reduced set of available functions, wherein the set of available functions are configured to control the reduced set of available functions.

14. A method of treating a turf site using a mobile treatment device, the method comprising:
identifying a plurality of regions of a turf site to be treated with the mobile treatment device, at least some of the plurality of regions being separated from each other;
determining a location of the mobile treatment device as it moves about the turf site;

determining that the mobile treatment device is located at an untreated portion of at least one of the plurality of regions;

automatically treating the untreated portion of the at least one of the plurality of regions as the mobile treatment device moves about the turf site;

generating a first user interface for a first user on a display device using a computing device, the first user interface providing a set of selectable options, the selectable options being associated with a set of available functions; and generating a second user interface for a second user on the display device using the computing device, the second user interface providing a reduced set of selectable options, the reduced set of selectable options being associated with a reduced set of available functions, wherein the set of available functions are configured to control the reduced set of available functions.

15. A mobile treatment device for treating a site, the mobile treatment device comprising:

a treatment system for applying a treatment to the site, the treatment system including a treatment controller;

a positioning system electronics configured to receive signals usable to determine a location of the mobile treatment device; and a computing device including at least a processing device and a computer readable storage device, the computing device in data communication with the positioning system electronics and operable to control the treatment system, the computer readable storage device storing data instructions executable by the computing device to cause the computing device to:

identify a plurality of regions of a site to be treated by the mobile treatment device, at least some of the regions being separated from each other;

determine a location of the mobile treatment device as it moves about the site using the positioning system electronics;

determine that the mobile treatment device is located at an untreated portion of at least one of the regions;

automatically treat the untreated portion of the at least one of the regions using the treatment system as the mobile treatment device moves about the site;

generate a first user interface for a first user on a display device using a computing device, the first user interface providing a set of selectable options, the selectable options being associated with a set of available functions; and generate a second user interface for a second user on the display device using the computing device, the second user interface providing a reduced set of selectable options, the reduced set of selectable options being associated with a reduced set of available functions, wherein the set of available functions are configured to control the reduced set of available functions.

16. A method of controlling a treatment system for treating a turf site, the method comprising:

identifying a plurality of regions of a turf site to be treated with the treatment system, at least some of the plurality of regions being separated from each other;

determining a location of the treatment system as it moves about the turf site;

determining that the treatment system is located at an untreated portion of at least one of the plurality of regions;

initiating treatment of the untreated portion of the at least one of the regions by the treatment system;

generating a first user interface for a first user on a display device using a computing device, the first user interface providing a set of selectable options, the selectable options being associated with a set of available functions; and generating a second user interface for a second user on the display device using the computing device, the second user interface providing a reduced set of selectable options, the reduced set of selectable options being associated with a reduced set of available functions, wherein the set of available functions are configured to control the reduced set of available functions.

17. A treatment control system for treating a site, the treatment control system comprising:

a spray controller;

positioning system electronics configured to receive signals usable to determine a location of the treatment system; and a computing device including at least a processing device and a computer readable storage device, the computing device in data communication with the positioning system electronics and operable to control the treatment control system, the computer readable storage device storing data instructions executable by the computing device to cause the computing device to:

identify a plurality of regions of a site to be treated, at least some of the regions being separated from each other;

determine a location of the treatment control system as it moves about the site using the positioning system electronics;

determine that the treatment control system is located at an untreated portion of at least one of the regions;

initiate treatment of the untreated portion of the at least one of the regions by a treatment system;

generate a first user interface for a first user on a display device using a computing device, the first user interface providing a set of selectable options, the selectable options being associated with a set of available functions; and generate a second user interface for a second user on the display device using the computing device, the second user interface providing a reduced set of selectable options, the reduced set of selectable options being associated with a reduced set of available functions, wherein the set of available functions are configured to control the reduced set of available functions.

18. The method of claim 1, wherein the options included in the reduced set of selectable options are selectable by the first user.

19. The method of claim 1, wherein the set of available functions includes setup functions that allow the first user to define job settings, wherein the second user is prevented from making changes to the job settings through the second user interface.

20. The method of claim 19, wherein the set of available functions includes defining boundaries of regions.

* * * * *